United States Patent [19]
Kool et al.

[11] Patent Number: 5,715,106
[45] Date of Patent: Feb. 3, 1998

[54] DISK SYSTEM WITH HEADERLESS TRACK FORMAT, EMBEDDED SERVO FIELDS AND CONSTANT DENSITY RECORDING

[75] Inventors: Fred A. Kool, Aptos; John S. Packer, San Jose, both of Calif.; Nicholas S. Assouad, Boulder, Colo.

[73] Assignee: Adaptec, Inc., Milpitas, Calif.

[21] Appl. No.: 324,298

[22] Filed: Oct. 17, 1994

[51] Int. Cl.$^6$ .................. G11B 5/09; G11B 5/596
[52] U.S. Cl. .................. 360/48; 360/49; 360/51; 360/78.04
[58] Field of Search .................. 360/46, 48, 51, 360/53, 60, 78.04, 49; 369/53, 59, 60; 395/460, 438, 439, 872

[56] References Cited

U.S. PATENT DOCUMENTS

| 5,075,804 | 12/1991 | Deyring | 360/53 X |
| 5,255,136 | 10/1993 | Machado et al. | 360/77.05 X |
| 5,276,564 | 1/1994 | Hessing et al. | 360/51 |
| 5,386,546 | 1/1995 | Hamaguchi | 395/425 |
| 5,500,848 | 3/1996 | Best et al. | 360/48 |
| 5,500,950 | 3/1996 | Becker et al. | 395/445 |
| 5,523,903 | 6/1996 | Hetzler et al. | 360/51 |

FOREIGN PATENT DOCUMENTS 0 522750 A2  1/1993  European Pat. Off.

*Primary Examiner*—Aristotelis M. Psitos
*Assistant Examiner*—Regina Y. Neal
*Attorney, Agent, or Firm*—Skjerven, Morrill, MacPherson Franklin & Friel; Alan H. MacPherson; David T. Millers

[57] ABSTRACT

A disk drive system for a constant density recording (CDR) format disk has a microprocessor which generates CDR words from split values stored in a ROM. The CDR words indicate how embedded servo sectors split data sectors into data fields. In one embodiment, during a seek to a track, the microprocessor stores in a data buffer the CDR words for requested data sectors on the track. Alternatively, track CDR tables are stored in the data buffer during start-up and altered during a seek. A disk sequencer reads CDR words from the data buffer into a FIFO buffer as required to locate splits in data sectors. Alternatively the microprocessor writes the CDR word directly into the FIFO buffer. Typically, the microprocessor writes CDR words for a data frame, into the FIFO buffer, during a servo burst preceding the data frame, but the microprocessor can wait two or more servo bursts before writing CDR words for two or more data frames. Data transfer for each requested data sector is initiated by a sector pulse. The CDR words can identify requested data sectors. Otherwise, the microprocessor suppresses sector pulses for unwanted data sectors or qualifies sector pulses with a signal that confirms a data sector is requested.

46 Claims, 14 Drawing Sheets

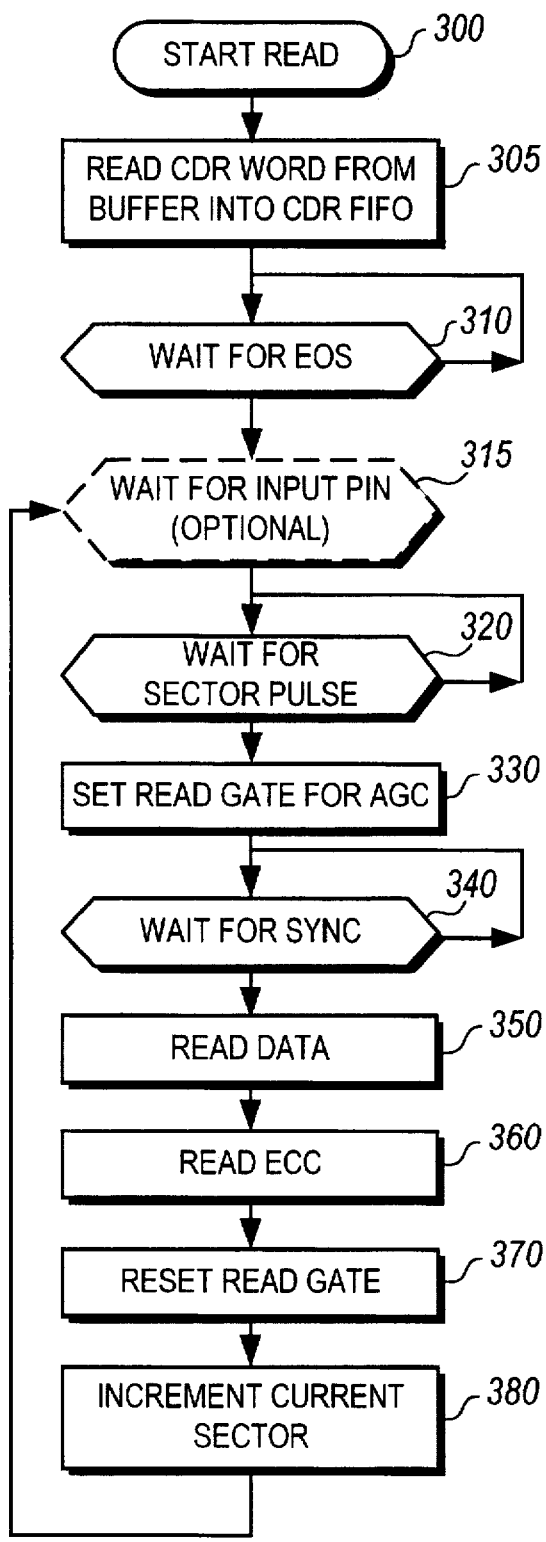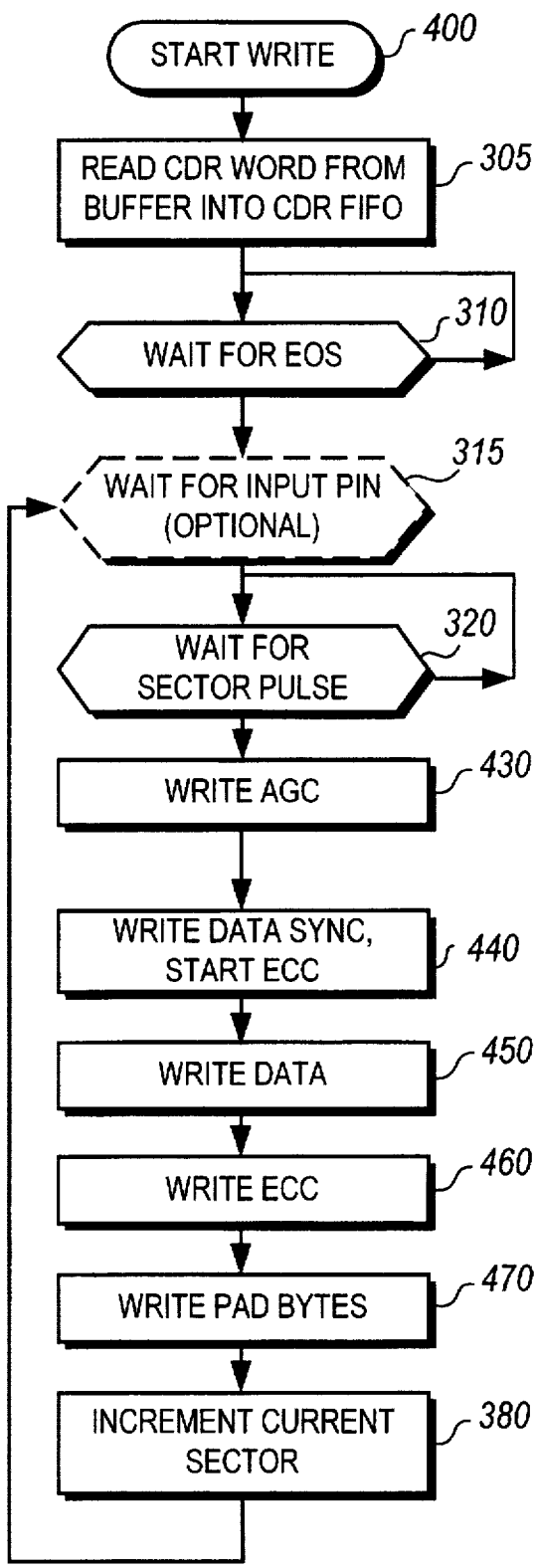
FIG. 3A
FIG. 4A

DISK SYSTEM WITH HEADERLESS TRACK FORMAT, EMBEDDED SERVO FIELDS AND CONSTANT DENSITY RECORDING

BACKGROUND OF THE INVENTION

1. Field of the Invention

This invention relates generally to methods and devices for reading and writing data on a disk and more particularly to reading and writing data on a disk with constant density recording and a headerless architecture.

2. Description of Related Art

Disks drive systems commonly record data on a disk in concentric tracks containing data sectors that may include headers and data fields, and servo sectors that may include automatic gain control (AGC) fields and synchronization marks. In a hard disk drive system, such as shown in FIG. 1A, a read/write head 55 writes to disk 30 by changing magnetization of a magnetic medium of disk 30, and reads from disk 30 by sensing the magnetization of areas of the magnetic medium. A positioning system that includes a microprocessor 40 and a servo sequencer 60 in the hard disk drive system uses the servo sectors from the medium to position read/write head 55 over desired data storage locations for reading and/or writing. For example, servo sectors typically include patterns that indicates a track's center, and servo sequencer 60 detects the patterns and provides signals to the disk drive electronics to keep read/write head 55 following the desired track as disk 30 rotates.

A common disk format for identifying data divides tracks into uniform size data sectors, with each data sector containing the same amount of information (a fixed amount of data, an error correction code, and a header). The amount of data in each data sector is typically 512 bytes which is a convenient amount of data for conventional digital memories. For these disk formats, a fixed number of servo sectors per data sector may provide too many or too few servo sectors. If there are too many servo sectors, disk space is wasted. If there are too-few servo sectors, track following is prone to errors.

In a constant density recording (CDR) system, the number of servo sectors and the number of data sectors on a track of disk 30 are independent, and the number servo sectors per data sector can vary from track to track and from data sector to data sector. FIG. 1B schematically shows an example of a portion of a CDR track format. In FIG. 1B, five servo sectors 110 to 114 are boundaries for four data frames 141 to 144 which contain five data sectors 121 to 125. Each of data sectors 121 to 125 contains a header 131 to 135 respectively but only some of the data sectors contain servo sectors. Data sector 121 has A bytes of data all in data frame 141 and does not include a servo sector. Data sector 122 contains servo sector 111, B bytes of data in a section of data frame 141, and C bytes in a section of data frame 142. Data sector 123 (124) has data in sections of two data frames and is divided by servo sector 112 (113). Data sector 125 has H bytes of data in data frame 144.

In FIG. 1A, a disk sequencer 20 transfers data between data sectors and data buffer 10 and must identify the start of the data on disk 30. Servo sequencer 60 transmits to disk sequencer 20 an end of servo sector (EOS) pulse for each servo sector read from or written to disk 30. EOS pulses do not necessarily indicate the start of data because in a CDR format, data sectors typically are not aligned with servo sectors. In one system, disk sequencer 20 identifies the start of target data by counting the bytes from read/write head 55 after an EOS pulse, comparing the count to an offset value, and beginning data transfer when the count equals the offset.

Once the start of data is identified, disk sequencer 20 uses split values to identify the servo sectors within a data sector. Split values indicate the amount of data storage in data fields of the data sectors. Data sector headers 131 to 135 in FIG. 1B contain split values A, B and C, D and E, F and G, and H which indicate the length of data fields in data sector 121 to 125 and therefore indicate the locations of servo sectors 111 to 114. Disk sequencer 20 uses the split values when transferring data. For example, during a read from data sector 123, disk controller 20 reads split values D and E from header 133 on disk 30, stores split values D and E in a FIFO buffer 22, and loads split value D from FIFO buffer 22 to a CDR counter 24. The count in CDR counter 24 is decremented as data are read from data sector 123. When the count equals zero, disk sequencer 20 stops reading data sector 123, and servo sequencer 60 processes servo sector 112. After servo sector 112, disk sequencer 20 resumes reading from data sector 123 and reads E more bytes of data.

A problem with the disk drive system of FIG. 1A is that data sector headers are required to contain the split values. The split values and the header reduce disk space usable for data storage. A disk system is desired that eliminates on-disk split values and data sector headers. A headerless architecture would increase data storage capacity of a disk by eliminating header synchronization marks, split values, and error recovery support required to detect and handle defective data sector headers.

SUMMARY OF THE INVENTION

In accordance with an embodiment of this invention, a disk drive system for reading or writing to a constant density recording (CDR) format disk includes a microprocessor which generates CDR words from tables in a first memory such as a ROM and writes the CDR words to a memory such as the data buffer or a FIFO buffer which is directly accessible by a disk sequencer. The values in first memory typically include a zone table and CDR tables in ROM and a defect table in RAM. Split values are not stored on the disk making more disk space available for data storage.

In one embodiment, the microprocessor generates CDR words for a transfer involving a series of data sectors on a track and writes the CDR words to a CDR table in a data buffer, during a seek before the transfer. In another embodiment, the microprocessor generates and writes CDR words to the data buffer during start-up and alters the appropriate CDR words for a transfer, during a seek. The disk sequencer reads at least some of the CDR words from the data buffer into a FIFO buffer before the start of the transfer. The reading of CDR word may be at specific times during execution of a transfer by the disk sequencer or may be done automatically by a FIFO filler working in the background while the disk sequencer executes a transfer. The disk sequencer reads the CDR words without microprocessor intervention so that the microprocessor has greater freedom in allocating processing time.

In accordance with another embodiment of this invention, a disk drive system transfers data to or from a data sector having data locations in more than one data frame. The transfer proceeds by first storing at least two values in a memory. The memory is typically a data buffer coupled to a disk sequencer, and the values are typically stored by a microprocessor during a seek to a track containing the data sector. A FIFO buffer is loaded in turn from the memory, and a CDR counter is loaded from the FIFO buffer. A transfer counter stores a value indicating the amount of data to be transferred to or from the data sector. The values in the counters change as each unit of data is transferred. In response to the value in the CDR counter reaching a first cutoff value, transfer of data is temporarily halted for execution of a servo bypass routine, and the CDR counter is loaded with a new value from the FIFO buffer. The servo bypass routine may read a servo sector or otherwise handle the cause of a split in the data sector's data. The value in the transfer counter reaching a second cutoff value indicates the end of the data transfer to or from the data sector. Transfers to or from a series of data sectors on a track repeat sector transfers according to this embodiment.

In another embodiment, the microprocessor periodically writes the CDR words to a FIFO buffer in a disk sequencer. The disk sequencer uses the CDR words sequentially from the FIFO buffer as counts indicating splits in data sectors. Typically, the microprocessor transfers a data frame's CDR words during a servo burst preceding the data frame, but more generally the CDR words may be transferred at any time before they are needed. For example, the microprocessor can wait two or more servo bursts before transferring CDR words for two or more data frames. Accordingly, the microprocessor has greater flexibility in allocating time for other tasks.

In accordance with another embodiment of this invention, a disk drive system transfers data to or from a series of data sectors on a track of a disk, where at least one of the data sectors in the series has data locations in more than one data frame. In the system, a microprocessor generates CDR words and loads the CDR words into a FIFO buffer. Typically, the FIFO buffer is in a disk sequencer which controls transfer of data between the disk and a data buffer. The CDR words in the FIFO buffer may be used as disclosed for the above-described embodiments.

A microprocessor may enable transfer of a series of data sectors by starting a disk sequencer just before a servo sector pulse which signals the beginning of a data frame containing at least part of a requested sector. Alternatively, the disk sequencer may have a first register which indicates the current data frame number and increments in response to servo sector pulses, and a second register which the microprocessor initializes with the data frame number of the first data frame containing a requested data sector. The disk sequencer automatically enables transfer when the current data frame equals the first data frame containing a requested data sector.

Typically, a data transfer for a requested data sector is in response to a data sector pulse. The microprocessor can suppress data sector pulses for defective or unwanted data sectors during a data transfer or can qualify data sector pulses with a second signal that indicates whether the disk sequencer should skip a data sector or not. Alternatively, the CDR word can contain a field which the microprocessor sets to indicate whether a data sector should be skipped or data should be transferred to or from the data sector.

Additionally, a disk sequencer may include registers containing sector numbers indicating the beginning and end of a series of data sectors in a requested transfer. In a zero latency transfer, the first data sector transferred may be in the middle of the series of requested data sectors. In this case, the disk sequencer pauses transfer of data sectors when a read/write head passes the end of the series and resumes transfer of data sectors when the read/write head reaches the beginning of the series.

BRIEF DESCRIPTION OF THE DRAWINGS

FIGS. 3A and 3B show flow diagrams of a method in accordance with this invention for reading data from a disk using a full track headerless architecture.

FIGS. 4A and 4B show flow diagrams of a method in accordance with this invention for writing data to a disk using a full track headerless architecture.

Use of the same reference symbols in different figures indicates similar or identical items.

DETAILED DESCRIPTION OF THE INVENTION

In accordance with an embodiment of the present invention, a disk drive system for reading or writing to a constant density recording (CDR) format disk has a microprocessor which generates CDR words from split values stored in a first memory that is not a disk. The CDR words provide information which indicates the number of bytes of data storage in data fields on a disk. Split values are not stored on the disk thereby making more disk space available for data storage.

In one embodiment, the CDR words generated by the microprocessor are written into a FIFO buffer of a disk sequencer which controls data transfers between the disk and a data buffer. Alternatively, the CDR words generated by the microprocessor are written into a second memory accessible to the disk sequencer and subsequently transferred from the second memory to the FIFO buffer. The microprocessor can alter the CDR words in the second memory as appropriate for a requested transfer and in particular, can set a flag indicating CDR words for data sectors that the disk sequencer should skip.

Figure 1A:
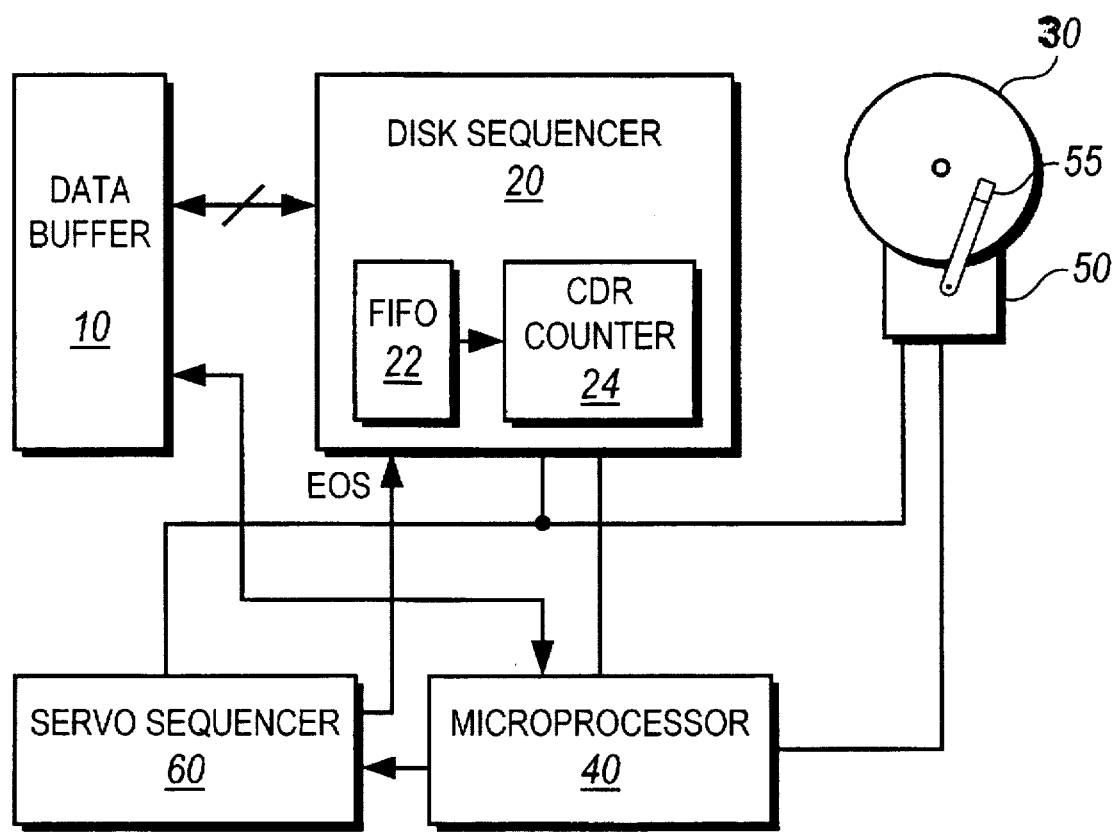
FIG. 1A shows a block diagram of a prior art disk drive system.
Figure 1B:
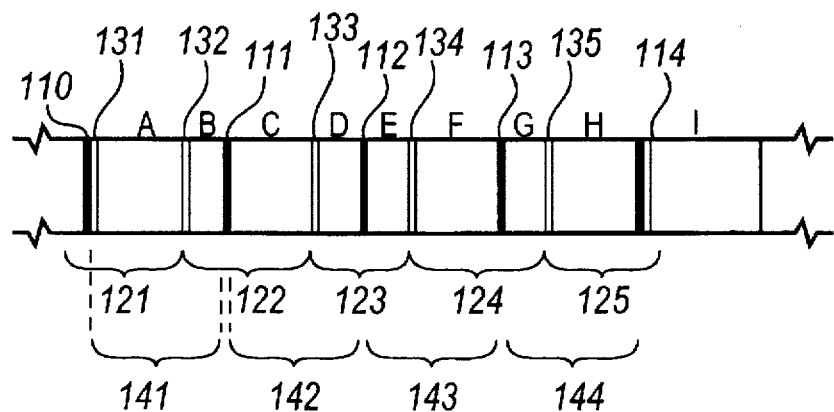
FIG. 1B schematically shows a portion of a prior art constant density recording (CDR) track format.
Figure 2B:
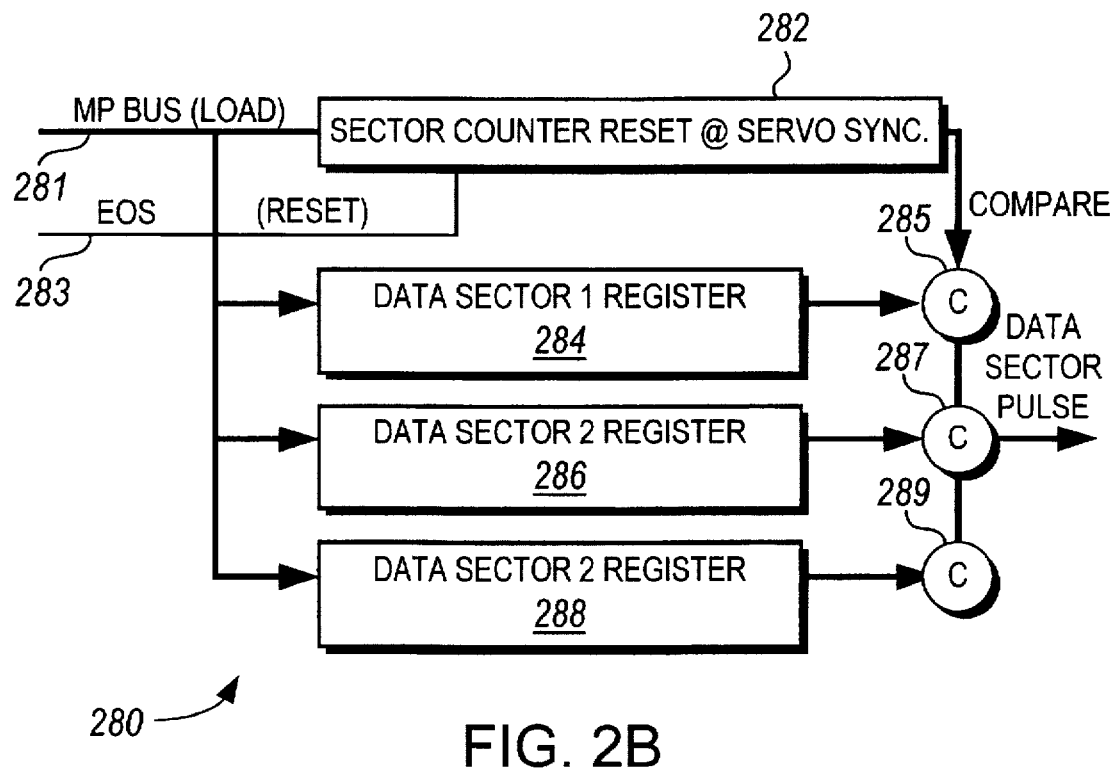
FIG. 2B shows a block diagram of a data sector pulse generator.
Figure 2A:
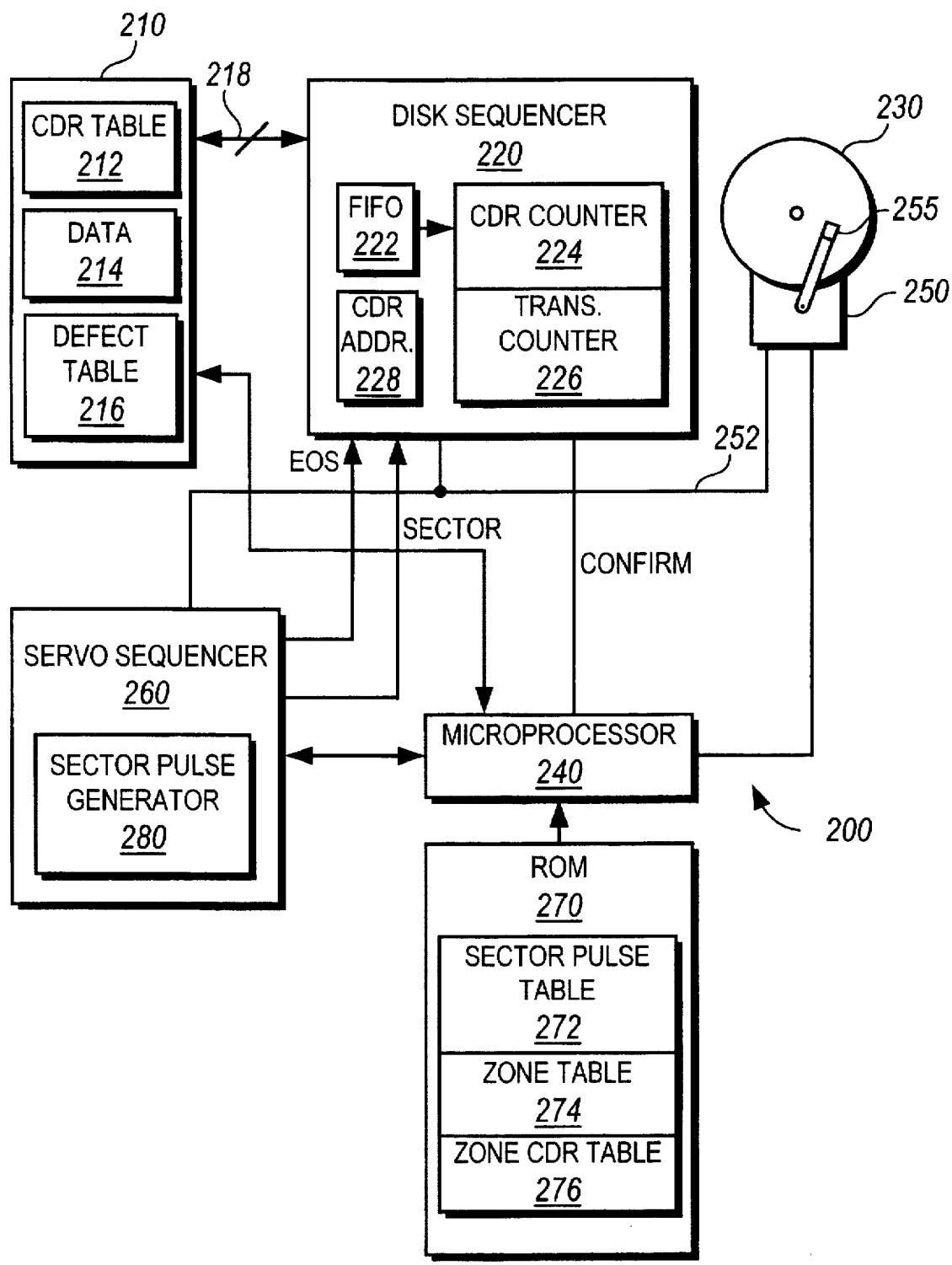
FIG. 2A shows a block diagram of a disk drive system for a full track headerless CDR architecture or a data sector headerless CDR architecture in accordance with this invention.

FIG. 2A is a block diagram of a disk drive system 200 wherein CDR words generated by a microprocessor 240 are written into a data buffer memory 210 which a disk sequencer 220 accesses during a read from, or write to a disk 230 which has a headerless CDR format. Microprocessor 240 generates the CDR words using information from a defect table 216, a zone table 274, and a zone CDR table 276 and writes the CDR words to a CDR table 212. Disk sequencer 220 reads from CDR table 212 as needed during a read from, or write to a track. Data storage space on disk 230 is increased because split values are not stored in headers on disk 230, and microprocessor 240 stores the CDR words in CDR table 212 before data transfer from a track begins so that time constraints on microprocessor 240 are relaxed when compared to disk drive systems that read split values from a header.

Microprocessor 240 executes firmware for controlling disk sequencer 220, a servo sequencer 260, and a servo system 250. The firmware executed by microprocessor 240 is stored in a read-only memory (ROM) 270. ROM 270 may be for example a programmable read-only memory (PROM), erasable programmable read-only memory (EPROM), or electrically erasable programmable read-only memory (EEPROM) which is external to microprocessor 240 or part of the same integrated circuit as microprocessor 240.

Servo sequencer 260 processes servo bursts that result from reading servo sectors, and a servo system 250 positions a read/write head 255 in response to signals from servo sequencer 260. Servo sequencers and servo systems for positioning a read/write head are well known in the art. The feature of servo system 250 and servo sequencer 260 of most importance to this invention is the ability to generate data sector pulses and end of servo sector (EOS) pulses for synchronizing of disk sequencer 220 with the media.

Disk sequencer 220 transfers data between disk 230 and data buffer memory 210. Disk sequencer 220 is programmable by microprocessor 240 and contains a first-in-first-out (FIFO) buffer 222 for CDR words. An example of disk sequencer 220 suitable for use with this invention is a part No. 8321 or 8371 disk sequencer available commercially from Adaptec, Inc. of Milpitas, Calif. Data transfers between disk 230 and data buffer memory 210 proceed via read/write head 255, signal line 252, disk sequencer 220, and an address/data bus 218 without intervention from microprocessor 240.

Data buffer memory 210 is a volatile memory which stores CDR table 212, data 214 read from or to be written to disk 230, and a defect table 216. CDR table 212 contains CDR words for data sectors to be read from or written to a track. Before a data transmission to, or from a data sector on disk 230, disk sequencer 220 reads one or more CDR words from CDR table 212 into FIFO buffer 222. The first CDR word is automatically moved from FIFO buffer 222 into a CDR counter 224. A CDR word typically indicates a number of bytes that can be read from a data sector before reaching a servo sector or a defect. The address of the CDR words in CDR table 212 for a transfer is indicated by a value in a register 228 which can be loaded by microprocessor 240 and incremented by disk sequencer 220.

Servo sequencer 260 asserts a data sector pulse to indicate the start of a data sector. FIG. 2B shows a block diagram of a data sector pulse generator 280 in servo sequencer 260. At each servo burst, an EOS pulse on line 283 resets a sector counter 282, and microprocessor 240 loads some or all of data sector registers 284, 286, and 288 with offset values from a sector pulse table 272 (FIG. 2A) via bus 281. Sector pulse table 272 contains offsets indicating the number of bytes between the EOS pulses and the starts of data fields for each zone of tracks on disk 230. Although FIG. 2B shows three data sector registers 284, 286, and 288, more generally the number of data sector registers equals the maximum number of data sector starts between two servo fields on disk 230. Sector counter 282 counts the bytes from read/write head 255 after the EOS pulse, and comparators 285, 287, and 289 compare offset values in respective data sector registers 284, 286, and 288 to the count in sector counter 282. If the count equals any of the offset values, servo sequencer 260 asserts a data sector pulse.

In response to a data sector pulse for a requested data sector in a data transfer, disk sequencer 220 transfers data between disk 230 and data buffer memory 210. Typically, the value in CDR counter 224 indicates the number of data bytes, i.e., the amount of data, to be transferred before a servo sector or a defect, and disk sequencer 220 decrements the value in CDR counter 224 as each data byte is transferred to or from disk 230. CDR counter 224 reaching a cutoff value (zero) indicates any subsequent signals on signal line 252 are not valid data to be processed by disk sequencer 220. Another embodiment of this invention uses a different convention from decrementing a positive value in CDR counter 224 to zero to indicate splits in a data sector. For example, a positive or negative value can be changed (increased or decreased) to reach any desired cutoff value that indicates the end of valid data in a data field.

When the value in CDR counter 224 reaches the cutoff value, data transfer is interrupted, and a servo bypass routine is executed. Typically, servo sequencer 260 executes the servo bypass routine by reading a servo sector. Disk sequencer 220 automatically moves another split from FIFO buffer 222 into CDR counter 224 when CDR counter 224 reaches the cutoff value, i.e. times-out. Data transfer resumes after servo sequencer 260 generates an EOS pulse. Once all the data is transferred to, or from a data sector, data transfer proceeds for the following data sectors as described above. Data transfer continues data sector by data sector until the transfer is complete.

CDR table 212 contains CDR words for the requested data sectors to be read or written on a track. The requested data sectors may be sequentially located on the track or separated by data sectors that are defective, spare, or unwanted for other reasons such as for a fragmented file which is stored on non-contiguous data sectors. Microprocessor 240 generates new CDR words for CDR table 212 based on the requested data sectors, defect table 216, zone table 274, and zone CDR table 276. Zone table 274 has entries that describe a zone of tracks. For example, an entry of zone table 274 may contain the physical addresses of tracks in the zone, the number of data sectors per track in the zone, the data frequency of the zone, and pointers to further information for the zone. Zone CDR table 276 contains the split values for each data sector on a defect free track. Each zone's entry in zone table 274 contains a pointer to the zone's split values in zone CDR table 276.

For a transfer request that indicates a data transfer to or from data sectors between two given data sectors, microprocessor 240 uses defect table 216 to determine which data sectors have defects or are spares and must be skipped. For one method in accordance with the present invention, CDR table 212 does not contain CDR words for the skipped data sectors. Alternatively, CDR words for skipped data sector can contain a value or flag indicating the data sector should be skipped during transfer by disk sequencer 220.

In one embodiment where CDR words for skipped data sectors are not provided in CDR table 212, microprocessor 240 suppresses data sector pulses for the skipped data sectors. A data sector pulse can be suppressed by not loading offset values for skipped data sectors into sector pulse generator 280. Disk sequencer 220 does not transfer data or CDR words for the skipped data sectors, and the CDR words in CDR table 212 stay synchronized with the data sectors. In another embodiment, microprocessor 240 asserts a signal CONFIRM to disk sequencer 220 to indicate data sector pulses for skipped data sectors.

Figure 3B:
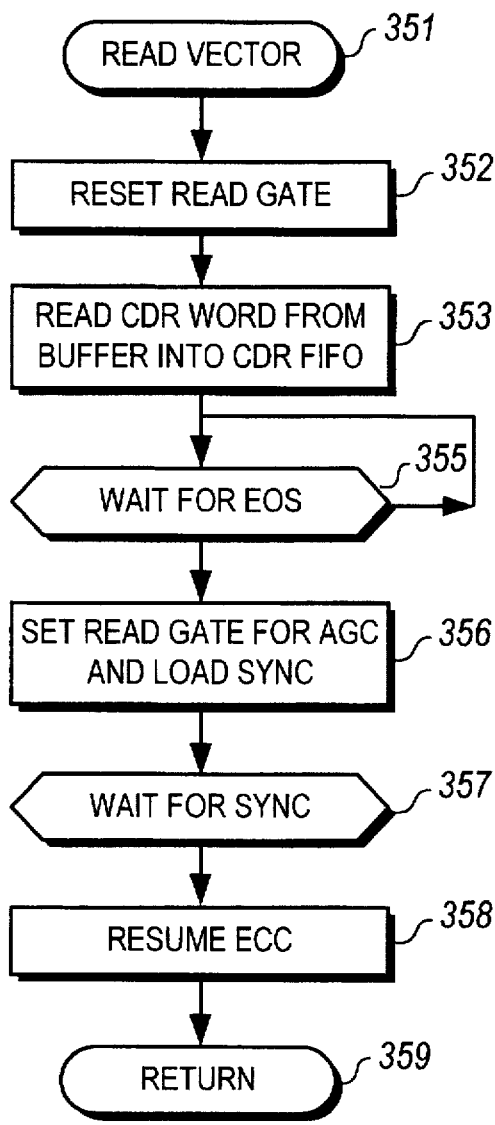

FIGS. 3A and 3B show flow charts of a method in accordance with this invention for reading data from a disk 230 using a full track headerless architecture. During a seek to a track, microprocessor 240 writes CDR words into CDR table 212. Examples of CDR words for CDR table 212 are disclosed below in regard to FIGS. 5A to 5D. A transfer counter 226 is loaded with a count of bytes to be read from a data sector. The count for transfer counter 226 can be provided in code executed by disk sequencer 220 or from a register preloaded by microprocessor 240. Microprocessor 240 loads disk sequencer 220 with a data sector number indicating the first data sector to be read and an address to the first CDR word required from CDR table 212. After building CDR table 212 and loading registers in disk sequencer 220, disk sequencer 220 is aligned to the data sectors using data sector pulses from data sector pulse generator 280 in FIG. 2B. In a particular embodiment disclosed below, microprocessor 240 only initializes the data sector pulse generator's data sector registers 284, 286, and/or 286 with offsets to requested data sectors so that data sector pulses are only generated for requested data sectors and are suppressed for unwanted data sectors.

When microprocessor 240 determines that read/write head 255 is in the data frame before the servo sector that defines a boundary of the data frame containing the data sector to be transferred, microprocessor 240 starts read process 300. In step 305, disk sequencer 220 reads one or more CDR words from CDR table 212 and loads the CDR words into FIFO buffer 222. The first CDR word from FIFO buffer 222 is immediately transferred to CDR counter 224.

Disk sequencer 220 then waits in step 310 for an EOS signal from servo sequencer 260. Servo sequencer 260 processes a servo burst while disk sequencer 220 waits for the EOS signal. When servo sequencer 260 detects a servo synchronization mark, sector counter 282 (FIG. 2B) is reset and started. Microprocessor 240 reads a set of offset values from sector pulse table 272 and loads some or all of data sector registers 284, 286, and 288 (FIG. 2B) with the offset values. When disk sequencer 220 receives the EOS signal, disk sequencer 220 transitions from wait for EOS step 310 to either wait for confirm signal step 315 or wait for data sector pulse step 320. Step 315 is performed only in an embodiment where microprocessor 240 loads data sector registers 284, 286, or 288 (FIG. 2B) for data sectors that are not to be read. In step 315, disk sequencer 220 waits for a confirm signal, indicating whether the next data sector pulse starts a data sector to be skipped. When disk sequencer 220 receives the confirm signal, processing transfers from step 315 to step 320. In an embodiment where data sector pulses are suppressed for unwanted data sectors, processing transfers directly from step 310 to step 320.

Disk sequencer 220 waits in step 320 for a data sector pulse. When comparator 285, 287, or 289 (FIG. 2B) detects that the value in data sector register 284, 285, or 288 equals the value in sector counter 282, a data sector pulse is generated. Upon receiving the data sector pulse, disk sequencer 220 performs steps 330, 340, 350, 360, and 370 to read the data from the data sector. In alternative methods in accordance with this invention, the steps executed to read a data sector depend on the data sector format. Steps 330, 340, 350, 360, and 370 are representative of a typical headerless CDR data sector format that includes an automatic gain control (AGC) field and a data synchronization field before the data and an error correction field after the data.

In step 330, a read gate is set for disk sequencer 220 to process signals from read/write head 255 including AGC signals. Disk sequencer 220 then waits in step 340 for a data synchronization signal. Upon receipt of the data synchronization signal, disk sequencer 220 transfers from step 340 to step 350 and reads data sequentially from the data sector and writes the data to data buffer memory 210. During read data step 350, an error correction code (ECC), such as a checksum, is accumulated, and CDR counter 224 and transfer counter 226 are decremented for each byte of data read. If the value in CDR counter 224 reaches zero before the value in transfer counter 226 reaches zero, reading step 350 is interrupted for execution of a read vector 351 illustrated in FIG. 3B.

In read vector 351, the read gate is reset in step 352 to stop disk sequencer 220 from reading data from disk 230. In step 353, disk sequencer 220 reads the next CDR word from CDR table 212 into FIFO buffer 222 and transfers the oldest CDR word in FIFO buffer 222 to CDR counter 224. Alternatively, disk sequencer 220 can read two or more CDR words from CDR table 212 during every other servo burst or less frequently.

Upon completion of step 353, disk sequencer 220 waits in step 355 for an EOS pulse from servo sequencer 260. During step 355, servo sequencer 260 executes a servo bypass routine to process a servo pattern and keep read/write head 250 following the track. Also, the values in data sector registers 284, 286, and 288 of a data sector pulse generator 280 are updated. When the servo bypass routine is complete, servo sequencer 260 asserts the EOS pulse.

Upon receipt of the EOS pulse, disk sequencer 220 transitions from step 355 to step 356 where the read gate is set so that disk sequencer 220 can read an AGC field at the start of the next data field and define a synchronization pattern that disk sequencer 220 waits for in step 357. Disk sequencer 220 then waits in step 357 for a data synchronization pattern from read/write head 255 that matches the defined pattern. Upon receiving the data synchronization pattern, disk sequencer 220 transitions from step 357 to step 358. Disk sequencer 220 resumes accumulation of the ECC in step 358 and returns through step 359 to reading data in step 350 (FIG. 3A).

Reading data from disk 230 resumes in step 350, and the values in CDR counter 224 and transfer counter 226 are decremented for each byte of data read. If the value in transfer counter 226 reaches zero, step 350 is complete. Disk sequencer 220 loads into transfer counter 226 a count for the next data sector and transitions to step 360. In step 360, disk sequencer 220 reads an ECC from disk 230 and compares the ECC read from disk 230 to the accumulated ECC. If the ECCs differ, an error handling routine is executed.

If no error is detected, processing transfers to step 370 where the read gate is reset to stop disk sequencer 220 from reading signals from read/write head 255, and then the data sector number is incremented in step 380. Following step 380, steps 315 through 380 are repeated until all the specified sectors have been read or an error occurs.

Optionally, CDR counter 224 and/or FIFO buffer 222 can be flushed in step 380 after each data sector is read so that fresh CDR words are required for each data sector. Flushing clears CDR counter 224 and removes all CDR words from FIFO buffer 222. If CDR counter 224 is not flushed after each data sector is read, split values for two different data sectors can be combined into a single CDR word in CDR table 216 as disclosed below in regard to FIGS. 5A, 5B, 5C, and 5D. The CDR words in CDR table 212 depend on when CDR counter 224 and FIFO buffer 222 are flushed.

FIGS. 4A and 4

Figure 4B:
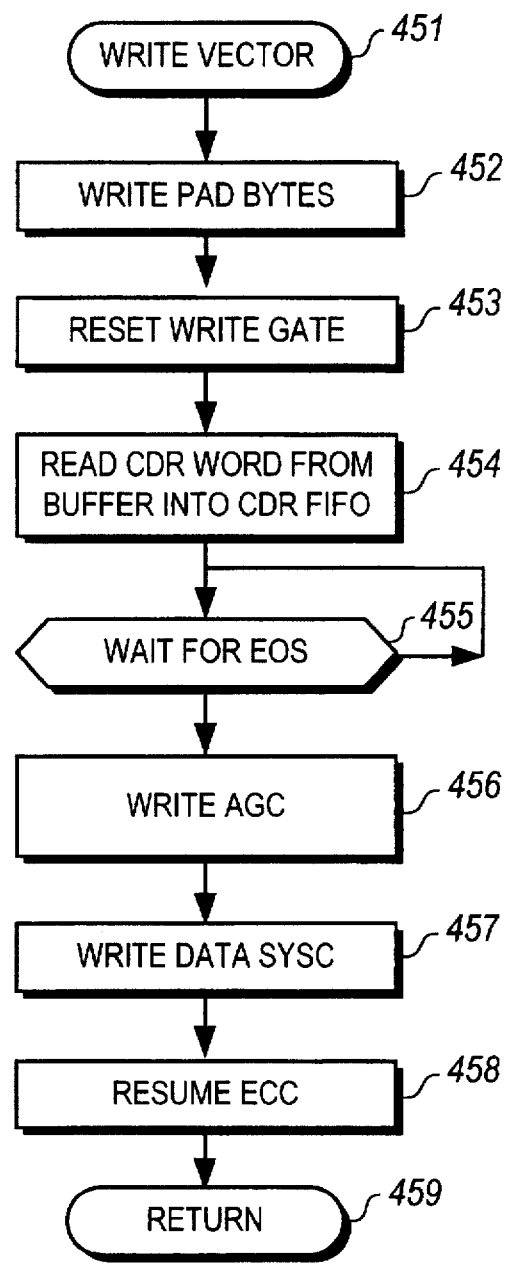

FIGS. 4A and 4B show flow charts of a method in accordance with this invention for disk drive system 200 (FIG. 2A) to write data to data sectors on a track with a headerless CDR format. The initial steps taken before a write process 400 are the same as the initial steps taken before read process 300 and are disclosed above. Initially, microprocessor 240 builds CDR table 212, loads into disk sequencer 220 the data sector number and an address in CDR table 212, and loads data sector pulse generator 280 (FIG. 2B) with offset values. Disk sequencer 220 loads transfer counter 226 with a total byte count to be written to the first data sector.

Steps 305, 310, 315, and 320 (FIG. 4A) for write process 400 are also the same as steps 305, 310, 315, and 320 (FIG. 3A) in read process 300 that were described above, and that description is incorporated herein by reference. In write process 400, upon receipt of the EOS pulse, disk sequencer transfers from step 320 to step 430. A write gate is set and disk sequencer 220 writes an AGC field in step 430 and then transitions to step 440 and writes a data synchronization field to disk 230. Also, in step 440, disk sequencer 220 initiates an ECC process and then transitions to step 450.

Disk sequencer 220 begins writing data 214 from data buffer memory 210 to disk 230 in step 450. While data is written, disk sequencer 220 decrements values in counters 224 and 226 and accumulates an ECC. If during step 460, the value in CDR counter 224 reaches zero before the value in transfer counter 226, writing step 450 is interrupted for write vector 451 of FIG. 4B.

Write vector 451 starts with step 452 where disk sequencer 220 writes pad bytes. Disk sequencer 220 then in step 453, resets the write gate and in step 454, reads a CDR word from CDR table 212 into FIFO buffer 222. A CDR word automatically moves from FIFO buffer 222 to CDR counter 224. Disk sequencer 220 then waits in step 455 for an EOS pulse. While disk sequencer 220 waits in step 455, servo sequencer 260 processes a servo burst and microprocessor 240 initializes data sector pulse generator 280. Upon completion of the servo burst, servo sequencer 260 asserts an EOS signal. Upon receiving the EOS pulse, the write gate is set again so that disk sequencer 220 can write in steps 456 and 457 an AGC field followed and a data synchronization field. Disk sequencer 220 then resumes the ECC process in step 458 before returning through step 459 to writing step 450 (FIG. 4A).

When the value in transfer counter 226 reaches zero, step 450 is complete, and disk sequencer 220 executes steps 460 and 470 by writing the accumulated ECC and pad bytes respectively. The data sector number is incremented in step 380 and writing continues for each requested data sector by repeating steps 315, 320, 430, 440, 450, 460, 470, and 380 as described above.

According to the methods of FIGS. 3A, 3B, 4A, and 4B, microprocessor 240 generates CDR words which are stored into CDR table 212 and used during a data transfer. In another method in accordance with this invention described below, a microprocessor generates CDR words and stores the CDR words in FIFO buffer for use during a transfer. In either case the CDR words generated depend on the format of the track involved in the transfer. FIGS. 5A, 5B, 5C, and 5D illustrate CDR track formats and generation of CDR words for the tracks.

Figure 5A:
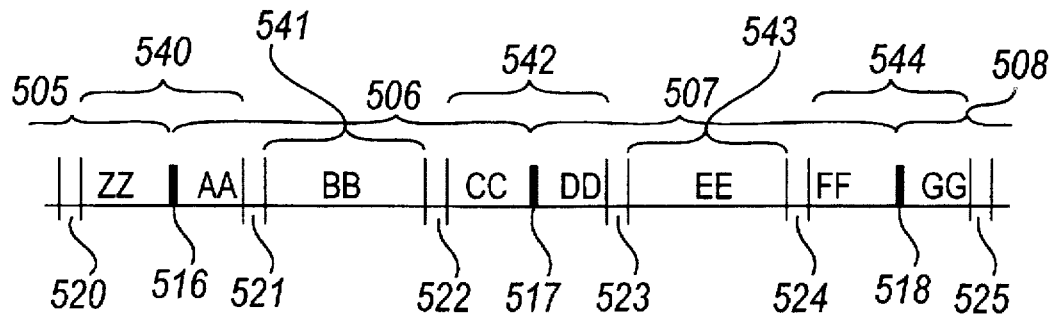
FIGS. 5A, 5B, 5C, 5D, and 5E schematically show portions of different headerless CDR track formats and the timing of data sector pulses generated in accordance with this invention.

FIG. 5A schematically shows a portion of a CDR track having multiple data frames per data sector. The portion shown contains six servo sectors 520 to 525, three data synchronization fields 516 to 518, and at least part of four data sectors 505 to 508. Each of data sectors 505 to 508 has data fields in up to three data frames. For example, data sector 506 has data fields in data frames 540, 541, and 542, and data sector 507 has data fields in data frames 542, 543, and 544. Values indicating the number of bytes in first, second, and third data field of each data sector 505 to 508 are provided in Table 1.

TABLE 1

| Data sector | Data Frame 1 | Data Frame 2 | Data Frame 3 |
|---|---|---|---|
| 505 | XX | YY | ZZ |
| 506 | AA | BB | CC |
| 507 | DD | EE | FF |
| 508 | GG | HH | II |

The entries of Table 1 depend on the track format and do not account for defects. Typically, several neighboring tracks have the same split values. Such tracks form a zone. Tracks in different zones have different formats and split values. Split values such as shown in Table 1 are included in ROM 270 in zone CDR table 276 (FIG. 2A) which contains one set of split values for each zone on disk 230.

Figure 5B:
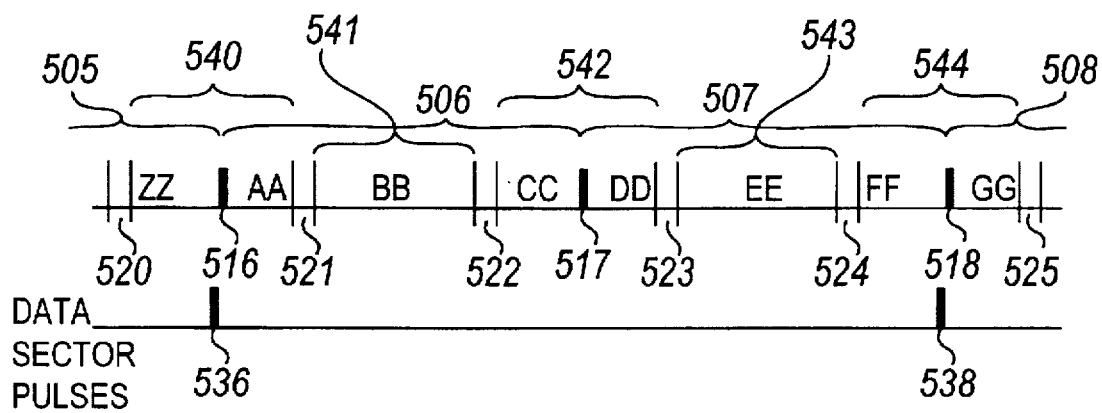

Generation and use of CDR words for the track format of FIGS. 5A and 5B are described here in regard to the methods of FIGS. 3A, 3B, 4A, and 4B. It will be understood that the CDR words generated can also be used in the methods disclosed below. Before a transfer such as read process 300 (FIG. 3A) or write process 400 (FIG. 4A), microprocessor 240 writes CDR words to CDR table 212 for a transfer to or from a track. Each CDR word may be for example a 16-bit value or a value expressed using more or fewer bits. The CDR words stored in CDR table 212 depend on zone CDR table 276 which indicates information similar to Table 1, defect table 216 which indicates defective and spare data sectors, the requested data sectors, and the transfer method including when FIFO buffer 222 and CDR counter 224 are flushed.

Assuming that data sectors 506 and 508 are the requested data sectors in a transfer, that data sector 507 is skipped because it is defective, spare, or unwanted for other reasons, and that CDR counter 224 is flushed only when the entire transfer is complete, a possible CDR table for the transfer would include CDR words AA, BB, CC+GG, HH, and II in that order. Each of the CDR words AA, BB, CC+GG, HH, and II is the total number of bytes in requested data sectors and between two splits in requested data sectors. Any of CDR words AA, BB, CC+GG, HH, and II that are equal to zero are not stored in CDR table 212. An alternative set of CDR words for CDR table 212 replaces the last CDR word II with a larger value so that transfer counter 226 ends the transfer as described below.

FIG. 5B shows the timing of data sector pulses relative to the position of read/write head 255 during the example transfer to or from data sectors 506 and 508. Before read/write head 255 reaches data sector 506, disk sequencer 220 loads CDR word AA into CDR counter 224 and loads a total byte count AA+BB+CC for data sector 506 into transfer counter 226. Data sector pulse 536 is asserted beginning a data transfer step 350 (FIG. 3A) or 450 (FIG. 4A) to, or from data sector 506. The values in counters 224 and 226 are decremented as each byte of data is transferred. The value in CDR counter 224 reaches zero when the value in transfer counter 226 is BB+CC, and execution transfers to read vector 351 or write vector 451. A new CDR word BB is loaded into CDR counter 224 from FIFO buffer 222 while servo sector 521 is processed. After data transfer step 350 or 450 resumes, the value in CDR counter 224 again decrements to zero, and read vector 351 or write vector 451 are again executed. CDR word CC+GG is loaded into CDR counter 224. Data transfer step 350 or 450 resumes again. When the value in CDR counter 224 is GG, the value in transfer counter 226 reaches zero and indicates transfer step 350 or 450 for data sector 506 is complete. Disk sequencer 220 stops reading data and disk sequencer 220 loads value GG+HH+II into transfer counter 226. The sector number is incremented in step 380 and disk sequencer 220 waits in step 320 for a data sector pulse.

Microprocessor 240 suppresses the data sector pulse for data sector 507, i.e., does not load a data sector register in data sector pulse generator 280 with an offset to data sector 507, during servo burst 522. The values in counters 224 and 226 remain unchanged as data sector 507 rotates past read/write head 255, and disk sequencer 220 continues to wait in step 320 for a data sector pulse. Data sector pulse 538 is asserted for data sector 508, and data transfer step 350 or 450 for data sector 508 proceeds in a manner similar to that described above for data sector 506. When the value in transfer counter 226 is zero, the transfer is complete. FIFO buffer 222 and CDR counter 224 are flushed to remove any CDR words from FIFO buffer 222 or any residual count from CDR counter 224. Accordingly, the last CDR word in CDR table 212 can be larger than II without changing the transfer.

If CDR buffer 224 is flushed after transfer of each requested data sector, possible CDR words for CDR table 212 for a transfer of data sectors 506 and 508 include CDR words AA, BB, CC, GG, HH, and II. Alternatively, CDR word CC or II can be replaced by a larger value because a residual in CDR counter 224 is flushed after transfer for a requested data sector. An example transfer proceeds as follows. Three CDR words AA, BB, and CC are loaded into FIFO buffer 222 in step 305. CDR word AA is loaded into CDR counter 224 from FIFO buffer 222. A total byte count for data sector 506 is loaded into transfer counter 226. After data transfer step 350 or 450 begins, CDR words BB and CC from FIFO buffer 222 are sequentially loaded into CDR counter 224 during read vector 351 or write vector 451 when the values AA and BB decrement to zero respectively. When the value in transfer counter 226 decrements to zero, transfer step 350 or 450 is complete for data sector 506. Any remainder in CDR counter 224 is flushed, and CDR words GG, HH, and II are loaded into FIFO buffer 222. Again the CDR words from FIFO buffer 222 are sequential loaded into CDR counter 224 as data transfer causes the values to decrement to zero completing the data transfer.

Figure 5D:
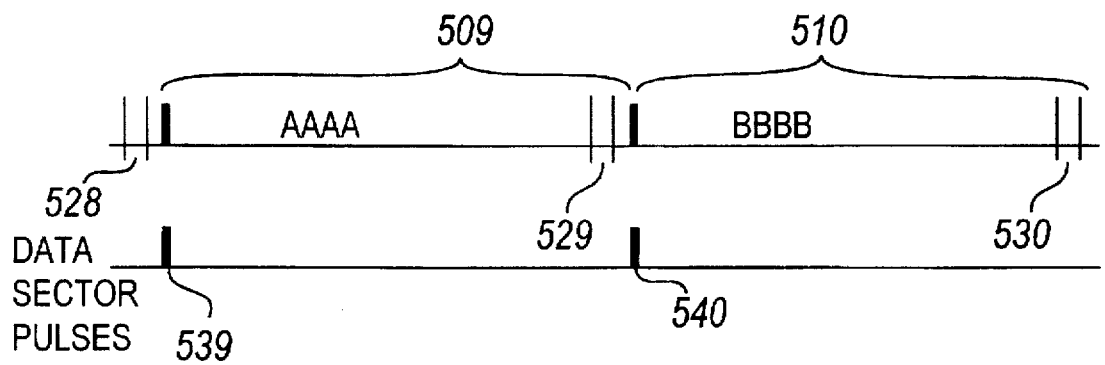
Figure 5C:
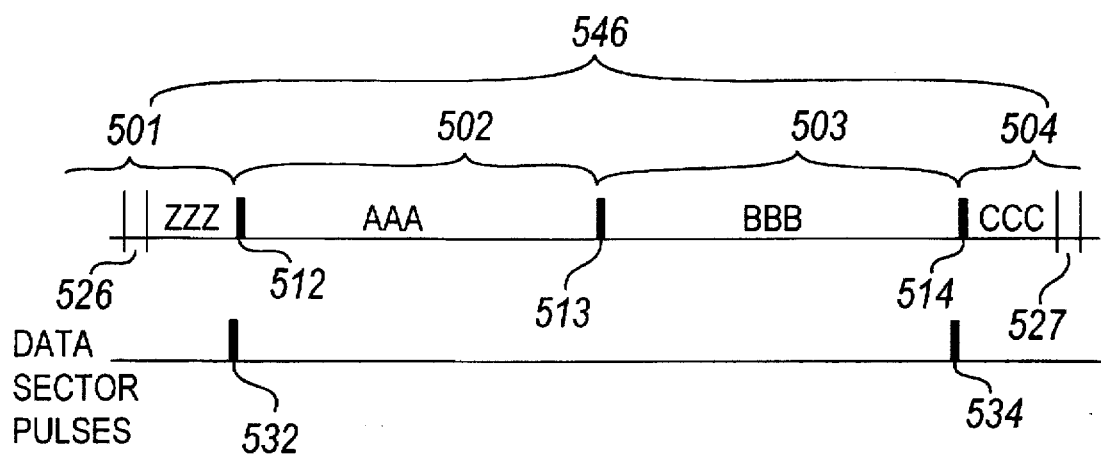

FIG. 5C schematically shows a portion of a headerless CDR track format having multiple data sectors per data frame. The portion of track shown contains two servo sectors 526 and 527, three data sector synchronization fields 512, 513, and 514, and at least part of four data sectors 501, 502, 503, and 504. A data frame 546 between servo sectors 526 and 527 contains at least a portion of each of data sectors 501 to 504. Data sectors 501 and 504 are split into two data fields by servo sectors 526 and 527 respectively. Split values in Table 2 indicate the number of bytes in the data fields of the data sectors 501 to 504.

TABLE 2

| Data sector | First Data Frame | Second Data Frame |
|---|---|---|
| 501 | YYY | ZZZ |
| 502 | AAA | 0 |
| 503 | BBB | 0 |
| 504 | CCC | DDD |

Split values equal to zero indicate all data in data sectors 502 and 503 are in one data field and no data is after a split. Typically, value AAA equals value BBB, and all data sectors contain the same amount of data. More generally, value AAA may differ from value BBB.

The CDR format of FIG. 5C can also be read or written using the methods of FIGS. 3A, 3B, 4A, and 4B or the methods disclosed below. Assuming that a transfer requests only data sectors 502 and 504 and CDR counter 224 is not flushed until the transfer is complete, possible CDR words for the transfer would include AAA+CCC and DDD. As above, CDR word DDD may be replaced by a larger value. During the transfer, CDR word AAA+CCC is loaded into CDR counter 224, and the total byte count AAA for data sector 502 is loaded into transfer counter 226. Disk sequencer 220 decrements the values in counters 224 and 226 while transferring data. The value in transfer counter 226 reaches zero when the value in CDR counter 224 is CCC. Disk sequencer 220 then loads the total byte count CCC+DDD for data sector 504, the next requested data sector, into transfer counter 226. Data sector 503 is skipped so that the values in counters 224 and 226 remain unchanged as data sector 503 passes read/write head 255. Data transfer for data sector 504 proceeds until the value in CDR counter 224 is zero indicating a split in data sector 504. After the split is handled, data transfer for data sector 504 proceeds until transfer counter 226 is zero indicating the transfer is complete.

If CDR counter 224 is flushed after every requested data sector, possible CDR words for the transfer include AAA, CCC, and DDD. If both CDR counter 224 and FIFO buffer 222 are flushed after a completed transfer to or from a data sector, the previous CDR words could be used or the CDR words might include AAA, 0, CCC, and DDD. CDR words AAA and 0 are loaded into FIFO buffer 222 for the first requested data sector 502. CDR words CCC and DDD are loaded into FIFO buffer 222 for the second requested data sector 504. FIG. 5D schematically shows three servo sectors 528 to 530 in a track having one data sector 509 or 510 per data frame. In this case, the CDR words could be the number of bytes per data sector AAAA and BBBB, or if CDR counter 224 is flushed after each sector, each CDR word could be a larger than the number of bytes in the largest data sector. In either case, transfer counter 226 times out the transfer initiated by data sector pluse 539 or 540. Alternatively, use of CDR counter 224 may be disabled.

Figures 6A, 7A:
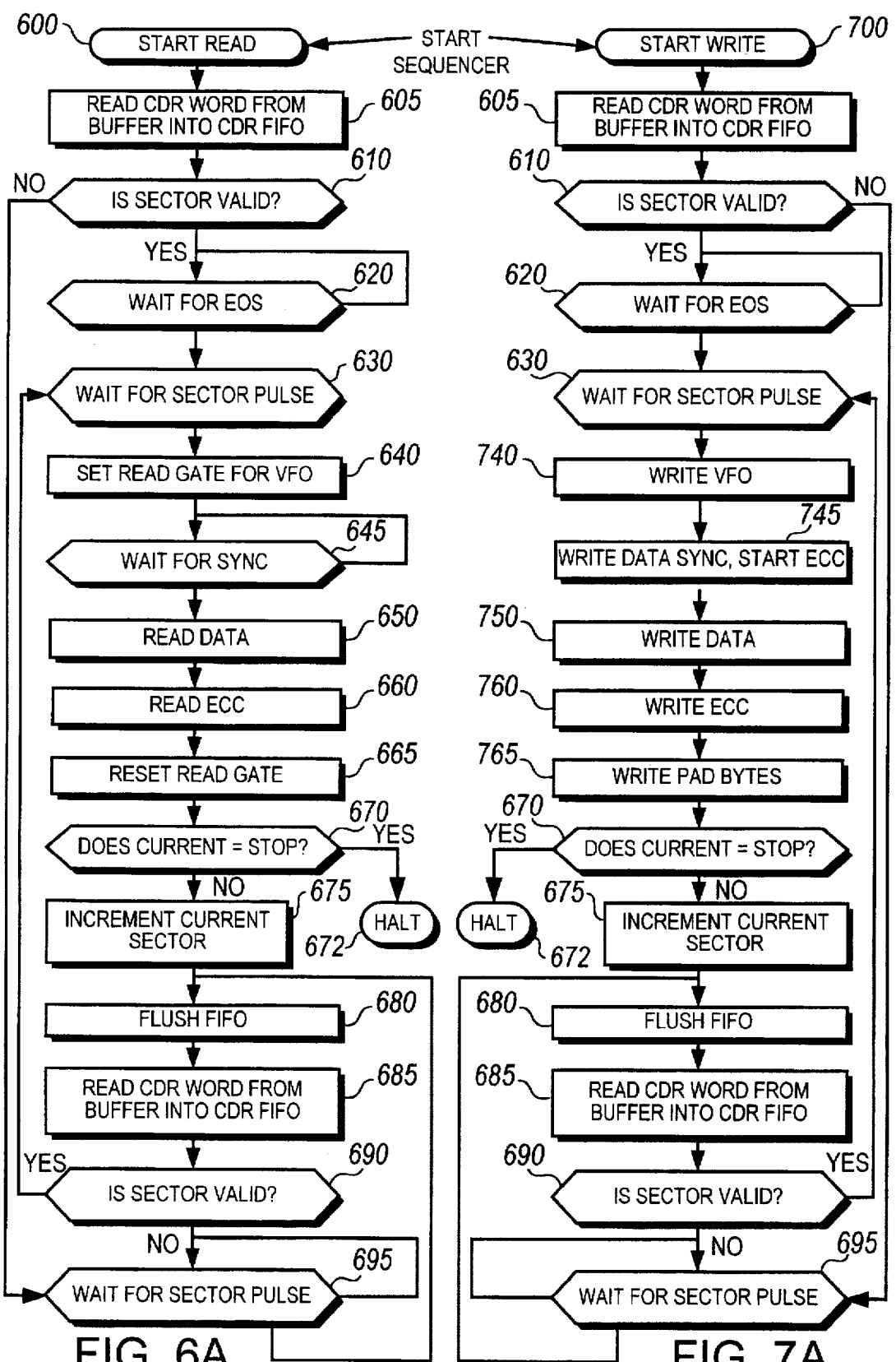
FIGS. 6A and 6B show flow diagrams of a method in accordance with this invention for reading data from a disk using a data sector headerless architecture.
FIGS. 7A and 7B show flow diagrams of a method in accordance with this invention for writing data to a disk using a data sector headerless architecture.
Figures 6B, 7B:
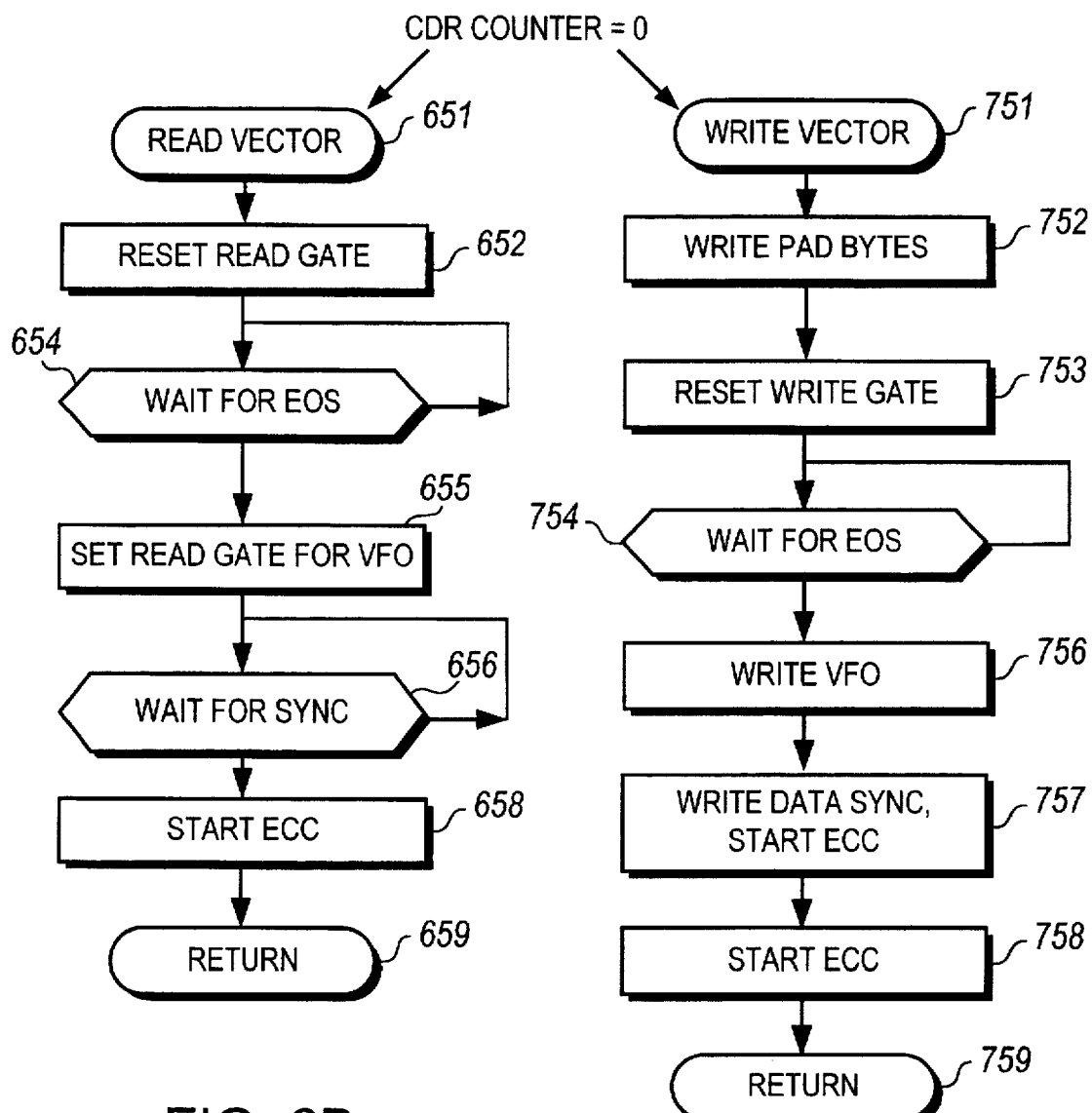

FIGS. 6A and 6B show flow diagrams of a method for using a data sector headerless architecture to read data from data sectors on a headerless CDR track. According to the method illustrated in FIGS. 6A and 6B, at the end of every data sector transfer, disk sequencer 220 flushes FIFO buffer 222 and CDR counter 224 and loads into FIFO buffer 222

CDR words for the next data sector. Each data sector has an entry in CDR table 212 which and each entry contains the same number of CDR words. For example, if N is the maximum number of data fields for any data sector, each data sector whether requested or skipped has an entry in CDR table 212 containing N CDR words.

Each CDR word in CDR table 212 contains at least three fields a split value, a parity bit, and a validity bit. The split value indicates the amount of data in a data field of the data sector. The parity bit indicates the parity of the CDR word and is used for error checking. The validity bit indicates if the data sector is a valid data sector to be read or written, or a data sector to be skipped. Disk sequencer 220 checks the validity bit of the first CDR word for a data sector to determine whether a transfer is performed for the data sector. Accordingly, sector pulse generator 280 asserts sector pulses for every data sector including requested, defective, and spare data sectors.

There are several possible configurations of CDR table 212. In one configuration, CDR table 212 contains an entry for every data sector from the first requested data sector to the last requested data sector, inclusive, and microprocessor 240 writes the CDR words to CDR table 212 during a seek to the track. This configuration requires a relatively small amount of data storage in data buffer 210 but may require microprocessor 240 to transfer a relatively large amount of data every seek.

In another configuration, CDR table 212 contains entries for every data sector on a track, and microprocessor 240 alters CDR table 212 during every seek. For a seek which moves read/write head 255 from one zone on disk 230 to another and therefore from a track with one set of split values to a new track having a different split values, microprocessor 240 generates new CDR words for CDR table 212. For a seek which does not change zones, the new track has the same split values as the old track, and microprocessor 240 changes just the validity and parity bits in CDR table 212 to reflect requested and skipped data sectors on the new track.

Microprocessor 240 loads into a register (not shown) in disk sequencer 220 a sector number indicating the first requested data sector. Microprocessor 240 also loads a pointer CDRADDR into a register 228 to indicate the address of the entry in CDR table 212 for the first requested data sector. Disk sequencer 220 increments the sector number and pointer CDRADDR as CDR words are moved from CDR table 212. To prevent reading past the end of CDR table 212 when a requested transfer includes the last sector followed by the first sector on a track, CDR table 212 contain two adjacent copies of the CDR words for a track so that reading of the CDR words for a last data sector in the first copy is followed by reading the CDR words for the first data sector in the second copy. This configuration requires more data storage in data buffer 210 than the previous configuration, but altering CDR words rather than writing CDR words may require less of the microprocessor's processing time.

In still another configuration, CDR table 212 contains one or two copies of CDR tables for every zone on disk 230. CDR table 212 can be constructed during start-up from zone CDR table 276 in ROM 270. During each seek, microprocessor 240 changes the validity and parity bits in CDR words for the next data transfer and loads into disk sequencer 220 a pointer CDRADDR indicating the address of the CDR words for the first requested data sector. This configuration requires more data storage in data buffer 210 than the previous two configurations.

In still another configuration, the format of the CDR words in CDR table 212 differ from each other. One example is where only the first CDR word of an entry for a data sector contains a validity bit or value. Another example is where one type of CDR word in CDR table 212 provides validity values indicating whether one or more data sectors are to be skipped and a second type of CDR word provides split values. In view of this disclosure, many other ways of partitioning information among CDR words will be apparent to those skilled in the art.

When CDR table 212 is ready, microprocessor 240 loads into register 228 the address of the first CDR word required for the transfer and loads a second register (not shown) with a physical data sector number indicating the first requested data sector in disk sequencer 220, and then before the EOS pulse prior to the first requested data sector, microprocessor 240 starts disk sequencer 220 executing read process 600. In response to being started, disk sequencer 220 executes step 605 and reads an entry of one or more CDR words from CDR table 212 into FIFO buffer 222.

Immediately after step 605, a CDR word is loaded from FIFO buffer 222 to CDR counter 224. In step 610, disk sequencer 220 tests the parity bit to determine if the CDR word is valid, tests the validity bit to determine if the next data sector is to be read, and then strips off the parity and validity bits. If the validity bit indicates that a data transfer is to be performed for the next data sector, disk sequencer 220 proceeds to step 620 and waits for an EOS pulse and then proceeds to step 630 and waits for the data sector pulse at the start of the data sector involved in the data transfer. If the validity bit indicates that the next data sector is to be skipped, disk sequencer 220 transfers from step 610 to step 695 and waits for a data sector pulse.

In step 695, the data sector pulse comes at the beginning of the data sector to be skipped, and disk sequencer 220 executes steps 680, 685, and 690 by flushing FIFO buffer 222 and CDR counter 224, reading CDR words for the following data sector into FIFO buffer 222, and checking the validity bit of the first CDR word of the following data sector. If the validity bit indicates that the following data sector is to be skipped, execution passes to step 695 again and disk sequencer 220 waits for another data sector pulse. While waiting in step 695, the first data sector to be skipped rotates past read/write head 255. Steps 680, 685, and 690 are repeated until a first CDR word for a data sector indicates the data sector is a valid data sector to be read, and then execution of read process 600 continues with step 630.

From either step 620 or 690, disk sequencer 220 waits in step 630 for the data sector pulse at the beginning of a requested data sector. Once the data sector pulse is received, a read gate is set for disk sequencer 220 to read in step 640, an AGC field. Disk sequencer 220 then waits in step 645 for a data synchronization signal. Upon receiving the data synchronization signal, disk sequencer 220 begins accumulation of an ECC and in step 650, reads data from disk 230 and writes the data to data buffer 210. While data is read in step 650, values in counters 224 and 226 are decremented. If the value in CDR counter 224 reaches zero, step 650 is interrupted, and a read vector 651 illustrated in FIG. 6B is executed.

In read vector 651, disk sequencer 220 resets the read gate to stop reading data and stops accumulation of the ECC in step 652, and then in step 654, disk sequencer 220 waits for an EOS signal while microprocessor 240 and servo sequencer 260 execute a servo bypass routine. Another CDR word is automatically loaded from FIFO buffer 222 into CDR counter 224 when the value in CDR counter 224 reaches zero. Upon receiving the EOS signal, disk sequencer 220 sets, in step 655, the read gate for reading an AGC field and then waits in step 656 for a data synchronization pulse. After receiving the data synchronization pulse, disk sequencer 220 resumes in step 658 the ECC process before returning through step 659 to step 650 of FIG. 6A.

During step 650, the value in transfer counter 226 reaching zero indicates that reading data for the data sector is complete, and disk sequencer 220 reads in step 660 an ECC from disk 230. The ECC read from disk 230 is compared to the ECC accumulated during step 650 and if the two differ an error routine is executed. If no error is detected, step 665 is executed, and disk sequencer 220 resets the read gate. Disk sequencer 220 checks in step 670 whether the data sector number indicates the last requested sector has been read. If the last data sector has been read, read process 600 is complete and stops in step 672. If the last sector has not been read, step 675 increments the current sector number; and steps 680, 685, and 690 as disclosed above are executed.

FIGS. 7A and 7B show flow diagrams of a method for disk system 200 (FIG. 2A) to write data to data sectors on a headerless CDR track. A write process 700 is similar to the read process 600 disclosed above. Similar CDR words are used in CDR table 212, and microprocessor 240 starts execution of write process 700 before the EOS signal prior to the first requested data sector. Steps 605 and 610 are executed as described above in regard to FIG. 6A, and then steps 620 and 630 or 695, 680, 685, 690, and 630 also as described above in regard to FIG. 6A are executed.

Following a data sector pulse for a requested data sector where data is to be written, disk sequencer 220 sets a write gate and executes steps 740, 745, and 750 to write respectively an AGC field, a data synchronization field, and data to disk 230. In step 750 while writing data, disk sequencer 220 accumulates an ECC and decrements values in counters 224 and 226. If the value in CDR counter 224 reaches zero, step 750 is interrupted for execution of a write vector 751 illustrated in FIG. 7B.

In write vector 751, disk sequencer 220 writes pad bytes in step 752, resets the write gate to stop writing in step 753, and then in step 754, waits for an EOS signal while microprocessor 240 and servo sequencer 260 execute a servo bypass routine. Another CDR word is automatically loaded from FIFO buffer 222 into CDR counter 224 when the value in CDR counter 224 is zero. Upon receiving the EOS signal, disk sequencer 220 sets the write gate and then in steps 756 and 757 writes an AGC field and a data synchronization field before resuming accumulation of the ECC in step 758 and returning through step 759 to step 750 of FIG. 7A.

During step 750, the value in transfer counter 226 reaching zero indicates that writing data to a sector is complete, and in steps 760 and 765 disk sequencer 220 respectively writes the ECC and pad bytes to disk 230. Disk sequencer 220 checks in step 670 if the data sector number indicates the last requested sector has been written. If the last data sector has been written, write process 700 is complete and stops in step 672. If the last sector has not been written, write process 700 continues with steps 680, 685, and 690 as disclosed above.

Figure 8:
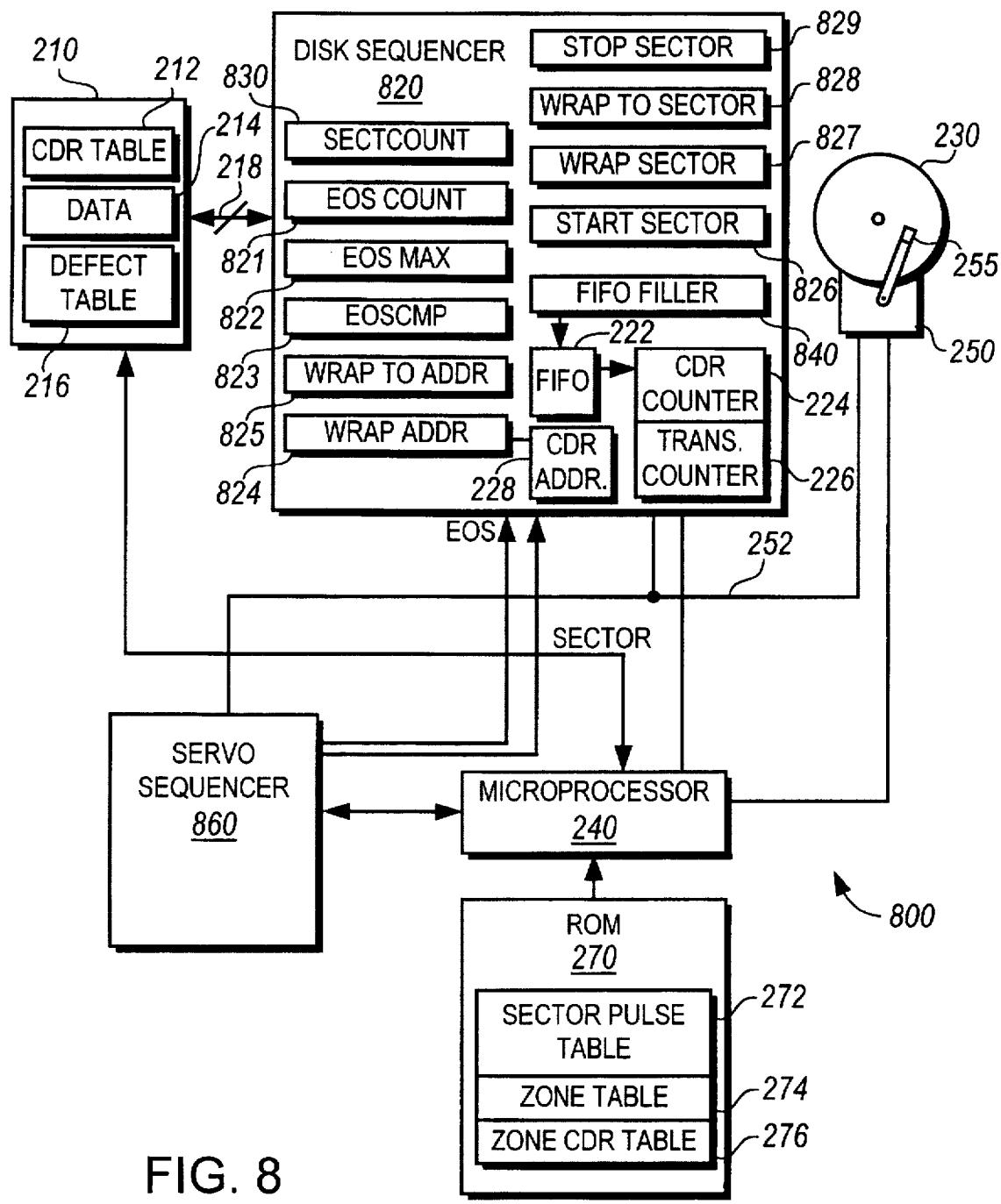
FIG. 8 shows a block diagram of a disk drive system for an enhanced data sector headerless CDR architecture in accordance with this invention.

FIG. 8 shows a disk drive system 800 for an alternative data sector headerless architecture in accordance with another embodiment of this invention. Disk drive system 800 contains an enhanced disk sequencer 820 which uses registers 821 to 830 to indicate wrap-around addresses in CDR table 212, to indicate the current data frame and current data sector, and to implement zero latency transfers. Microprocessor 240 can read from, or write to registers 821 to 830.

Registers 824 and 825 respectively hold values WRAPADDR and WRAPTOADDR which indicate the end and beginning of a CDR table in data buffer 210. Register 228 holds pointer CDRADDR which indicates the address of the next CDR word read from CDR table 212. Disk sequencer 820 increments pointer CDRADDR after each CDR word is read from CDR table 212 into FIFO buffer 222. When pointer CDRADDR equals value WRAPADDR, disk sequencer 820 sets pointer CDRADDR equal to value WRAPTOADDR (the beginning of the CDR table for the current track) so that the next CDR word is read from the beginning of the CDR table. With this wrap around technique, a single copy of CDR table 212 in data buffer 210 is sufficient, and memory requirements of disk drive system 800 are reduced when compared to systems which require two copies of the CDR table. Microprocessor 240 loads values CDRADDR, WRAPADDR, and WRAPTOADDR to registers 228, 824, and 825 during a seek to a track, at the same time that CDR table 212 is being prepared for a transfer.

Disk sequencer 820 includes a FIFO filler 840 which fills FIFO buffer 222 with CDR words pointed to by pointer CDRADDR in register 228. Accordingly, each time a CDR word from FIFO 222 is removed, FIFO filler 840 automatically writes a new CDR word from CDR table 212 to FIFO buffer 222. When FIFO buffer 222 is flushed to remove CDR words for only one data sector, values for other data sectors are preserved in FIFO buffer 222. To aid in removing of only the remaining CDR words for one data sector, a flag bit in the CDR words marks the last CDR word for each data sector. For example, if each data sector has an entry in CDR table 212 and each entry contains three CDR words, the third CDR word in each entry in CDR table 212 has a flag bit set. During a flush of CDR words for one data sector, CDR words are removed from FIFO buffer until a removed CDR word has the flag bit set.

Registers 821, 822, and 823 hold values EOSCOUNT, EOSMAX, and EOSCMP respectively which keep track of the current data frame and eliminate the need for servo sequencer 860 or microprocessor 240 to keep a frame count. Disk sequencer 820 automatically increments value EOSCOUNT every time disk sequencer 820 receives an EOS pulse, and when value EOSCOUNT reaches value EOSMAX, disk sequencer 820 resets value EOSCOUNT register to 0. Accordingly, microprocessor 240 can initialize register 821 with a current data frame number and register 822 with the number of data frames on the current track, and disk sequencer 820 keeps value EOSCOUNT equal to the current data frame number. Initialization would typically occur when the data frame number is known such as at an index mark for the current track. Alternatively, servo sequencer 860 can assert index pulses to disk sequencer 820, which cause disk sequencer 820 to reset value EOSCOUNT.

Value EOSCMP indicates the data frame prior to the first data sector in a requested transfer. Disk sequencer 820 compares value EOSCOUNT to value EOSCMP, and when value EOSCOUNT equals EOSCMP, starts a data transfer after the next EOS pulse from servo sequencer 860. Accordingly, after initialization by microprocessor 240, disk sequencer 820 starts a transfer without microprocessor intervention. This provide greater freedom in allocating processing time of microprocessor 240 because microprocessor 240 does not need to keep track of the frame number or start disk sequencer 820 just prior to the first frame involved in the transfer.

Registers 826, 829, and 830 hold values STARTSECTOR, STOPSECTOR, and SECTCOUNT respectively. Value SECTCOUNT indicates a current physical data sector number. Value STARTSECTOR indicates the physical data sector number of the first data sector to be read in a requested transfer. Value STOPSECTOR indicates the physical data sector number of the last data sector to be read in a requested transfer. Registers 828 and 829 hold values WRAPSECTOR and WRAPTOSECTOR respectively for zero latency transfers.

For a zero latency read (ZLR) or write, data transfer may begin in the middle of a series of data sectors to be transferred. When read-write head 255 is over a data frame containing a data sector from the requested series, microprocessor 240 sets value STARTSECTOR to the physical data sector number of the first requested data sector in the next data frame, sets value STOPSECTOR to physical sector number of the last requested data sector in the current data frame, sets value WRAPSECTOR to the physical sector number of the end of the series of requested data sector, and sets value WRAPTOSECTOR to the physical sector number of the beginning of the series of requested data sector.

Figure 5E:
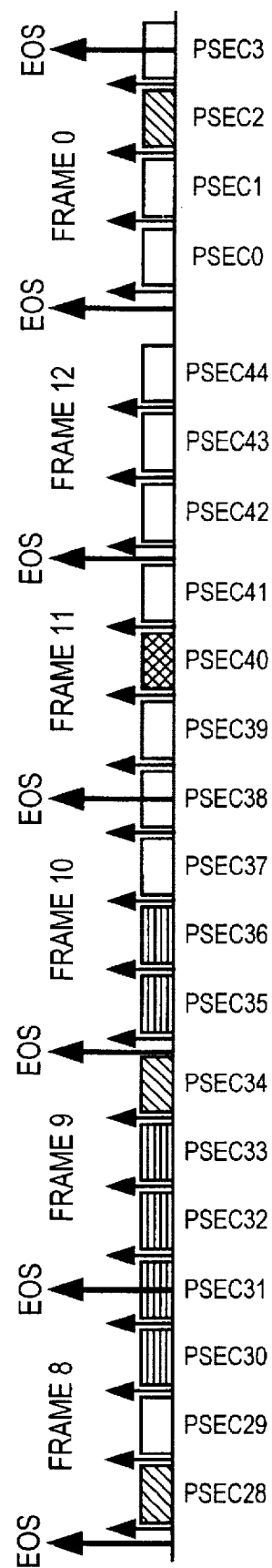

FIG. 5E illustrates and example portion of a track containing data sectors PSEC28 to PSEC44 and PSEC0 to PSEC3 which have physical data sector numbers 28 to 44 and 0 to 3 respectively. A requested read includes data sectors PSEC30, PSEC31, PSEC32, PSEC33, PSEC35, and PSEC36 which are in frames FRAME8, FRAME9, and FRAME10 having frame numbers 8, 9, and 10 respectively. A data sector PSEC34 is defective and therefore skipped. If read-write head 255 is in data frame FRAME8 when a ZLR begins, value EOSCMP is 8, value SECTCOUNT is 32, STARTSECTOR is 32, STOPSECTOR is 31, WRAPSECTOR is 36, and WRAPTOSECTOR is 30.

Once initialized, disk sequencer 820 increments value SECTCOUNT for each data sector pulse received after the EOS pulse received when value EOSCOUNT equals value EOSCMP. Reading data sectors begins when value SECTCOUNT equals value STARTSECTOR. When value SECTCOUNT reaches value WRAPSECTOR, reading of data sectors is paused, but disk sequencer 820 continues to increment value SECTCOUNT. Value SECTCOUNT is reset to zero following the EOS pulse when value EOSCOUNT reaches value EOSMAX, but incrementing of value SECTCOUNT continues. When value SECTCOUNT reaches value WRAPTOSECTOR, reading of data sectors resumes and proceeds until value SECTCOUNT reaches value STOPSECTOR.

For a sequential transfers of data sectors, microprocessor 240 initializes values STARTSECTOR and STOPSECTOR with the physical sector numbers of the lowest and highest physical data sector numbers in a requested transfer. Value WRAPSECTOR is set to a value higher than the highest physical sector number on the track so that value WRAPSECTOR does not affect the transfer. Disk sequencer 820 increments value SECTCOUNT in response to each data sector pulse. Data transfer begins when value SECTCOUNT equals value STARTSECTOR. Transfer of data sectors continues until value SECTCOUNT reaches value STOPSECTOR. Value SECTCOUNT is reset to zero when value EOSCOUNT reaches EOSMAX, and read/write head passes the highest number data sector.

Figure 9:
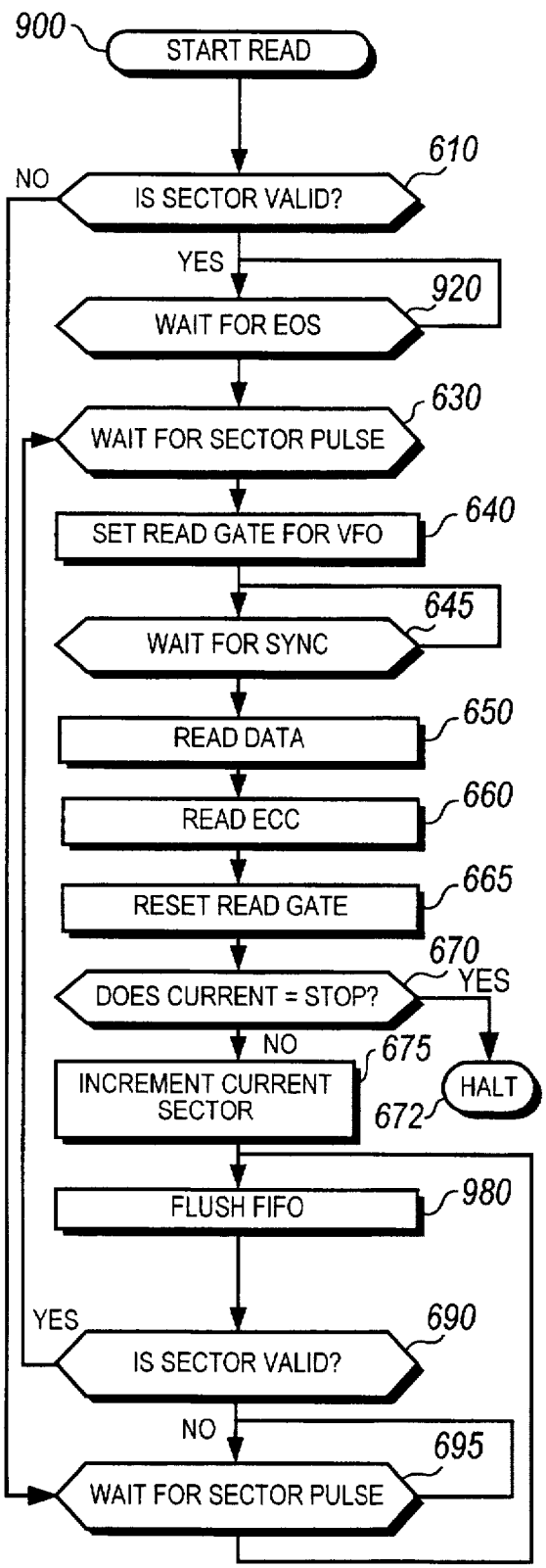
FIG. 9 shows a flow diagram of a method in accordance with this invention for reading data from a disk using an enhanced data sector headerless architecture.
Figure 10:
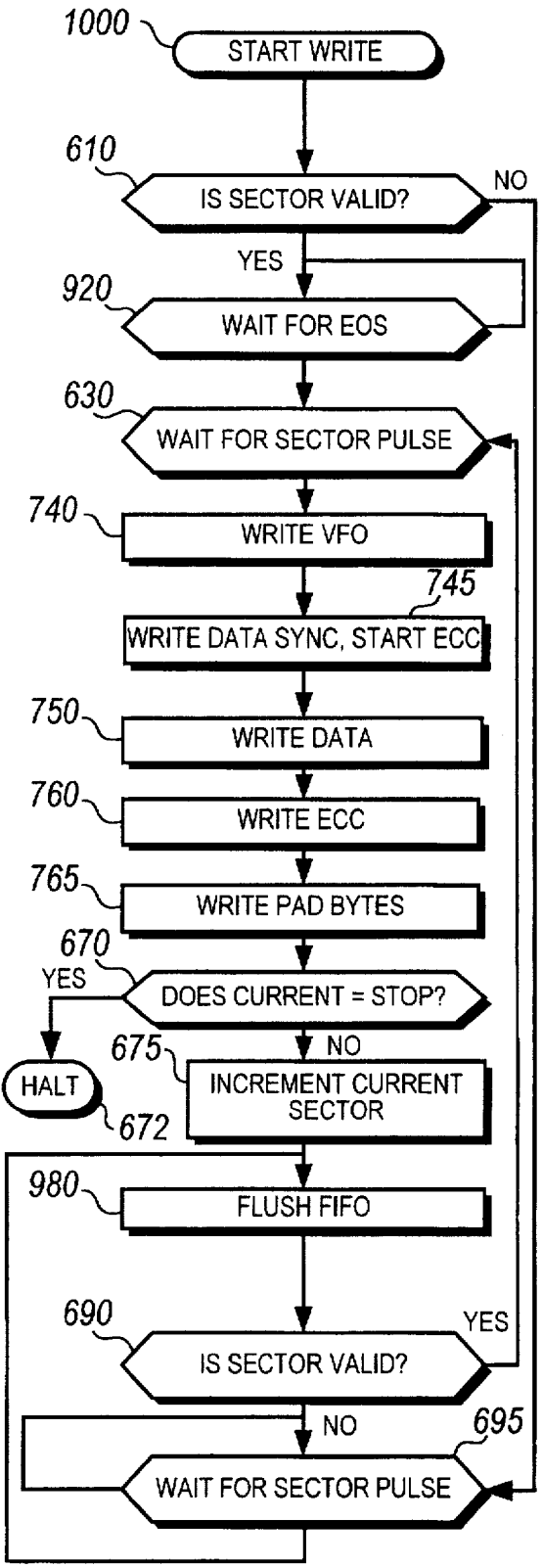
FIG. 10 shows a flow diagram of a method in accordance with this invention for writing data to a disk using an enhanced data sector headerless architecture.

FIGS. 9 and 10 show flow diagrams for reading and writing according to the data sector architecture of disk drive system 800 (FIG. 8). The methods of FIGS. 9 and 10 are substantially similar to the methods of FIGS. 6A and 7A respectively, and the above description of steps in FIGS. 6A and 7A, applies to identically number steps in FIGS. 9 and 10. The read process of FIG. 9 differs from the process of FIG. 6A in starting read process 900, automatic loading of CDR words from CDR table 212, and in flushing FIFO buffer 222.

FIFO filler 830 automatically fills FIFO buffer 222 when space is available in FIFO buffer 222, so that read process 900 begins with step 610 by checking the validity field of the first CDR word in FIFO buffer 222. Step 605 which reads CDR words into FIFO buffer 222 at a specific time is not required in read process 900 (or write process 1000). In step 920, disk sequencer 820 increments value EOSCOUNT for every EOS pulse received until an EOS pulse when value EOSCOUNT equals value EOSCMP. After value EOSCOUNT reaches value EOSCMP, read process 900 transitions to step 630 and continues to step 675 as described for read process 600 of FIGS. 6A and 6B. After step 675, any remaining CDR words for the current data sector are flushed from FIFO buffer 222. In step 980, only the CDR words remaining for the data sector just transferred or just skipped are removed from FIFO buffer 222. CDR words are removed from FIFO buffer 222 until a CDR word is removed which has a flag bit set to indicate the CDR word is the last entry for the data sector.

Write process 1000 is the same as write process 700 described in regard to FIG. 7 except that write process 1000 also differs in starting write process 1000, automatic loading of CDR words from CDR table 212, and in flushing FIFO buffer 222. In particular, step 605 and 685 present in write process 700 are omitted from write process 1000 because of automatic loading of FIFO buffer 222, and steps 620 and 680 of write process 700 are replaced by steps 920 and 980 which are the same as described for read process 900.

Figure 11:
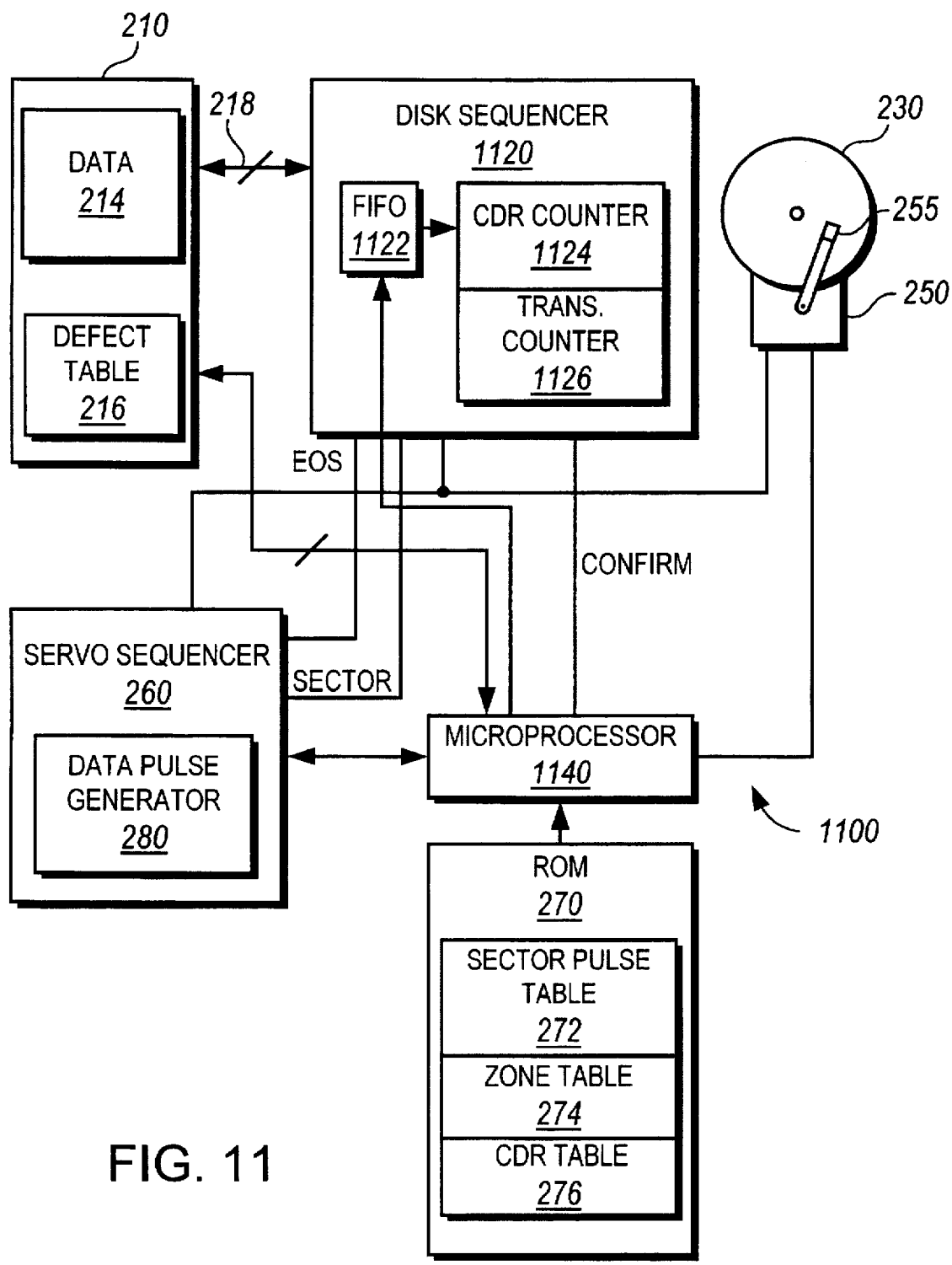
FIG. 11 shows a block diagram of a disk drive system for a data frame headerless CDR architecture in accordance with this invention.

FIG. 11 shows a disk drive system 1100 in accordance with another embodiment of this invention. In disk drive system 1100, a microprocessor 1140 writes CDR words to a FIFO buffer 1122 in a disk sequencer 1120 during transfers to or from a disk 230 having a headerless CDR format. Disk sequencer 1120 may be a sequencer such as a part no. 7184, 8265, 8370, or 8320 available from Adaptec, Inc. of Milpitas, Calif. The CDR words transferred by microprocessor 1140 may be the same as those described above in regard to FIGS. 5A to 5D, but in disk drive system 1100, microprocessor 1140 generates the CDR words on a per data frame basis rather than all at once for a CDR table.

In one method in accordance with this invention, microprocessor 1140 flushes FIFO buffer 222 during each servo burst and then fills FIFO buffer 1122 with CDR words for a data frame. With this method, the CDR words are split values which indicate the number of byte of data in data fields. According to another method in accordance with the invention, microprocessor 1140 flushes FIFO buffer 1122 every second, or third, or fourth, or more servo sectors and fills FIFO buffer 1122 with CDR words for two, or three, or four, or more data frames.

Figure 12A:
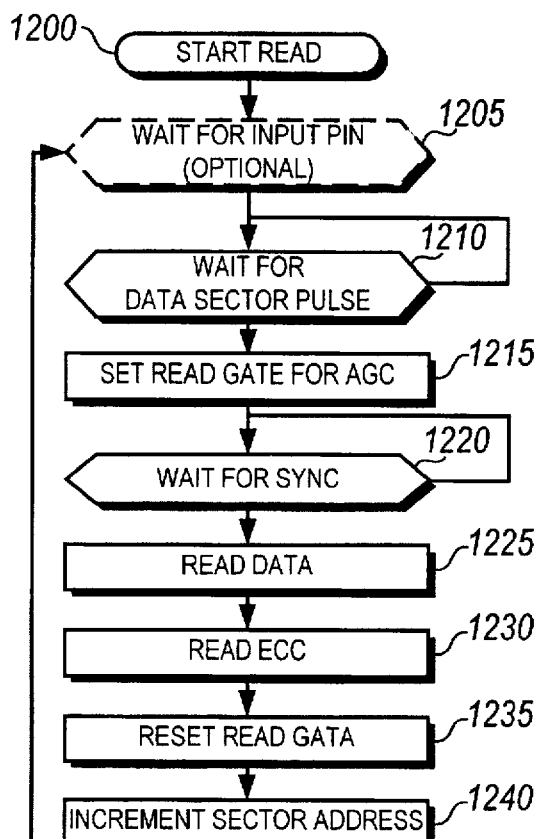
FIGS. 12A and 12B show flow diagrams of a method in accordance with this invention for reading data from a disk using a data frame headerless architecture.
Figure 12B:
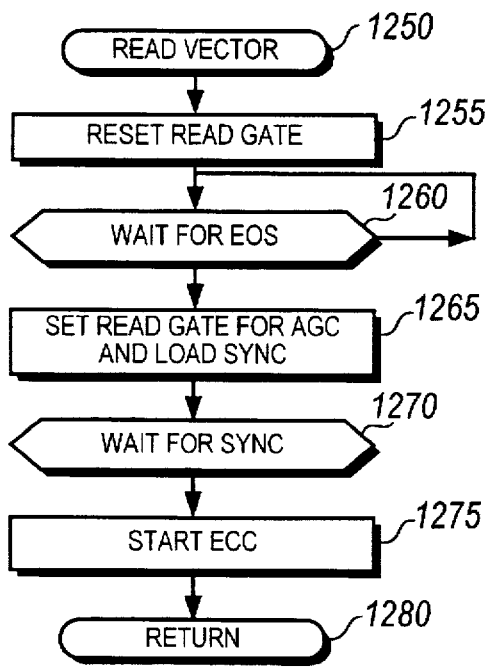

FIGS. 12A and 12B show flow diagrams of a method using a data frame headerless architecture for disk system 1100 (FIG. 11) to read data sectors. Before a first byte of data is read in step 1255 from disk 230, microprocessor 1140 retrieves one or more split values from zone CDR table 276 in ROM 270 and writes CDR words to FIFO buffer 1122, and disk sequencer 1120 loads the first CDR word from FIFO buffer 1122 to CDR counter 1124. Each CDR word depends on the number of bytes in data fields of the requested data sectors as described above in regard to FIGS. 5A and 5B. The number of CDR words written can vary depending on the capacity of FIFO buffer 1122 and how often microprocessor 1140 writes to FIFO buffer 1122. Typically, one CDR word or enough CDR words to describe one data frame are written to FIFO buffer 1122, but more CDR words can be written to efficiently use processing time of microprocessor 1140. Microprocessor 1140 uses defect table 216 to determine defective data sectors and does not write CDR words for defective data sectors to FIFO buffer 1122.

Before read process 1200 begins, transfer counter 1126 is initialized with a number of bytes to be read from a data sector. Microprocessor 1140 loads a data sector register in disk sequencer 220 with a data sector number indicating the first requested data sector to be read. As disclosed above, disk sequencer 1120 can be aligned to the requested data sectors using data sector pulses from data sector pulse generator 280, and microprocessor 240 may suppress data sector pulses for unwanted data sectors by only initializing a data sector pulse generator 280's data sector registers 284, 286, and 288 with offsets to requested data sectors.

Upon completion of the initial steps described above, read process 1200 starts. If microprocessor 1140 does not suppress servo pulses for unwanted data sectors, disk sequencer 1120 waits in step 1205 for microprocessor 1140 to assert a signal CONFIRM indicating a next data sector pulse is for a data sector to be read. Upon receiving a data sector pulse, read process 1200 transfers to step 1210. If microprocessor 1140 suppresses servo pulses for unwanted data sectors, step 1205 is skipped, and step 1210 begins read process 1200.

In step 1210, disk sequencer 1120 waits for a data sector pulse before transferring to step 1215 and setting a read gate to read an AGC field. Disk sequencer 1120 then waits in step 1220 for a data synchronization pulse from read/write head 255 and following the data synchronization pulse begins step 1225 which is reading data from the data sector and writing the data to data buffer memory 210. During step 1225, an ECC is accumulated. A byte count is loaded into transfer counter 1126, and then counters 1124 and 1126 are decremented according to the amount of data read. If the value in CDR counter 1124 reaches zero, disk sequencer 220 suspends step 1225, stops accumulating the ECC, and executes read vector 1250 of FIG. 12B.

Read vector 1250 starts with step 1255 and step 1260 where disk sequencer 1120 resets the read gate to stop reading data and then waits for an EOS signal while a servo bypass routine is executed by servo sequencer 260 and/or microprocessor 1140. While waiting in step 1260, disk sequencer 1120 loads a CDR word from FIFO buffer 1122 into CDR counter 1124 if a CDR word is available in FIFO buffer 1122. In order to avoid delays, microprocessor 1140 must write to FIFO buffer 1122 before CDR words are needed in CDR counter 1124. If microprocessor 1140 writes only one CDR word at a time to FIFO buffer 1122, the CDR word is written during the servo burst when disk sequencer 220 is executing steps 1250, 1255, and 1260. Servo sequencer 260 processes the servo sector or defect which caused the split in the data sector and asserts the EOS signal. Upon receiving the EOS signal, disk sequencer 1120 proceeds to step 1265 and sets the read gate to read an AGC field before waiting in step 1270 for a data synchronization mark. Upon sensing the data synchronization mark, disk sequencer 1120 resumes accumulation of the ECC in step 1275 and returns through step 1280 to reading data in step 1225 (FIG. 12A).

Reading data in step 1225 from disk 230 continues with the values in counters 1124 and 1126 being decremented for each byte of data read. If the value in transfer counter 1126 reaches zero, step 1225 is complete and disk sequencer 1120 reads an ECC from disk 230 in step 1230. The ECC read from disk 230 is compared to the accumulated ECC, and memory differ an error handling routine is executed. If no error is detected, the read process continues with step 1235. The read gate is reset in step 1235, and then the data sector number is incremented in step 1240. Steps 1205 through 1240 are repeated until all data sectors are read or an error occurs.

Figure 13A:
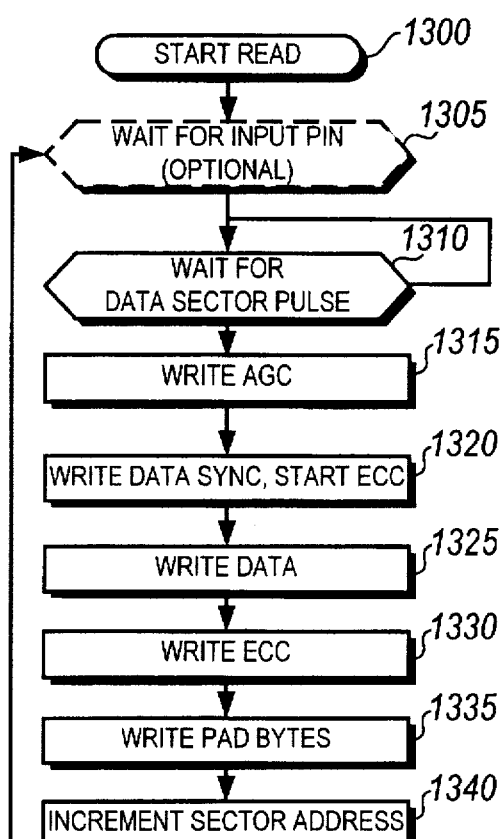
FIGS. 13A and 13B show flow diagrams of a method in accordance with this invention for writing data to a disk using a data frame headerless architecture.
Figure 13B:
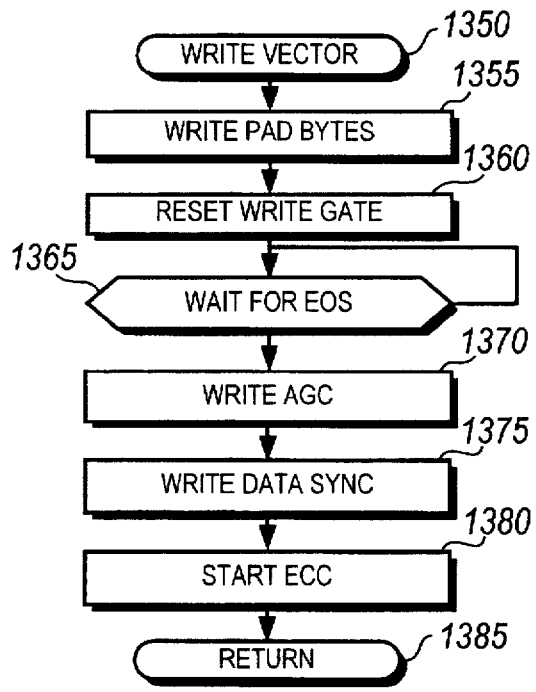

FIGS. 13A and 13B show flow charts show a method for disk drive system 1100 to write data. The initial steps preformed before starting write process 1300 are the same as the steps disclosed above as being before read process 1200. Microprocessor 1140 writes a CDR word to FIFO buffer 1122 which disk sequencer 1120 transfers to CDR counter 1124. Transfer counter 1126 is loaded with a count of bytes to be written to a data sector, and a sector pulse generator is initialized with offset values. Steps 1305 and 1310 are executed as disclosed above for steps 1205 and 1210 respectively of FIG. 12A, and then a write gate is set in step 1315 so that disk sequencer 1120 can write an AGC field. Following that, in step 1320, a data synchronization mark is written to disk 230 and accumulation of an ECC begins. After step 1320, disk sequencer 1120 begins step 1325 which is writing data from data buffer memory 210 to disk 230. While data is written in step 1325, disk sequencer 1120 decrements values in counters 1124 and 1126 and continues accumulating the ECC. If during step 1325, the value in CDR counter 1124 reaches zero, writing to disk 230 is interrupted for execution of write vector 1350 of FIG. 13B.

During write vector 1350, disk sequencer 1120 writes pad bytes in step 1355, then resets the write gate in step 1360, moves a CDR word from FIFO buffer 1122 to CDR counter 1124, and waits in step 1365 for an EOS signal while servo sequencer 260 processes a servo sector. Upon receiving the EOS pulse, the write gate is set again so that disk sequencer 1120 can write an AGC field in step 1370 and a write a data synchronization mark in step 1375. After writing the data synchronization mark, disk sequencer 1120 resumes accumulation of the ECC in step 1380 before returning in step 1385 to writing data in step 1325 (FIG. 13A).

When the value in transfer counter 1126 reaches zero, step 1325 is complete, and in steps 1330 and 1335 disk sequencer 1120 writes the accumulated ECC and pad bytes respectively to disk 230 which finishes the write to the sector. The data sector number is incremented in step 1340. Steps 1305 through 1340 are repeated for each requested data sector until all data is written.

Although the present invention has been described with reference to particular embodiments, the description is only an example of the invention's application and should not be taken as a limitation. In particular, even though much of preceding discussion was aimed at disks of magnetic medium containing magnetized areas, alternative embodiments of this invention include reading and/or writing optically readable marks on a disk. Additionally, although data is often referred to in units of bytes, other units of data such as bits or words may be counted. Various other adaptations and combinations of features of the embodiments disclosed will be apparent to those skilled in the art and are within the scope of the present invention as defined by the following claims.

We claim:

1. A method for transferring data to or from a track on a constant density recording format disk having a headerless data sector with data storage locations in more than one data field, the method comprising:

generating a control word from split values in a first memory;

writing the control word to a second memory;

loading a counter with a data count from the control word;

transferring data to or from the headerless data sector;

changing a value in the counter in response to units of data being transferred; and identifying a split in the headerless data sector from the value in the counter.

2. The method of claim 1, wherein writing the control word to a second memory comprises writing the control word to a first-in-first-out buffer in a disk sequencer which transfers the data to or from the headerless data sector.

3. The method of claim 2, wherein writing the control word occurs during processing of a servo sector.

4. The method of claim 1 wherein writing of the control word to the second memory further comprises writing the control word to a data buffer connected to a disk sequencer.

5. The method of claim 4, wherein writing the control word occurs during a seek to the track.

6. The method of claim 4, further comprising:

performing a seek to the track, after writing the control word; and modifying the control word during the seek.

7. A method for transferring data to or from a series of headerless data sectors on a track on a constant density recording format disk, wherein at least one of the headerless data sectors in the series has data locations in more than one data field, the method comprising:

generating control words which indicate data counts for fields in the headerless data sectors in the series, wherein the control words are generated from values in a first memory;

writing the control words into a second memory;

loading a first-in-first-out buffer from the control words in the second memory;

selecting a current data sector from the series of headerless data sectors;

loading a first counter with a first data count from the first-in-first-out buffer;

loading a second counter with a second data count that indicates an amount of data to be transferred to or from the current data sector; and transferring data to or from the current data sector, wherein values in the first and second counters change in response to each unit of data transferred and are used to identify boundaries of data fields.

8. The method of claim 7, wherein writing control words occurs during a seek.

9. The method of claim 7, wherein transferring data comprises:

halting the data transfer to or from the current data sector in response to the value in the first counter reaching a first cutoff value, and then executing a servo routine, loading the first counter with another data count from the first-in-first-out buffer, and upon completion of the servo routine, resuming the data transfer to or from the current data sector; and ending the data transfer to or from the current data sector in response to the value in the second counter reaching a second cutoff value.

10. The method of claim 9, wherein loading the first-in-first-out buffer comprises:

loading a first control word from the second memory into the first-in-first-out buffer before transferring data; and loading a second control word from the second memory into the first-in-first-out buffer after the value in the first counter reaches the first cutoff value.

11. The method of claim 7, wherein generating the control words comprises using a microprocessor to generate the control words.

12. The method of claim 11, wherein generating the control words further comprises the microprocessor accessing a first table containing split values for headerless data sectors on the track.

13. The method of claim 12, wherein generating the control words further comprises the microprocessor accessing a second table indicating defective data sectors and combining information from the first and second tables to generate the control words.

14. The method of claim 13, wherein:

writing control words into the second memory further comprises writing control words to a data buffer coupled to a disk sequencer; and transferring further comprises moving data between the data buffer and the current data sector via the disk sequencer.

15. The method of claim 13, wherein accessing the first table comprises accessing a non-volatile memory, and accessing the second table comprises accessing a volatile memory.

16. The method of claim 7, wherein:

generating control words is performed by a microprocessor; and writing the control words into the second memory comprises writing the control word to a data buffer coupled to a disk sequencer.

17. The method of claim 7, wherein:

writing the control word into the second memory further comprises writing the control words into a data buffer coupled to a disk sequencer; and transferring further comprises moving data between the data buffer and the current data sector via the disk sequencer.

18. The method of claim 17, further comprising loading into the disk sequencer a sector number indicating a data sector on the track, wherein:

generating comprises generating for each data sector on the track a set of control words corresponding to the data sector; and loading the first-in-first-out buffer comprises loading the first-in-first-out buffer with the set of control words corresponding to the data sector indicated by the sector number.

19. The method of claim 7, further comprising repeating selecting the current data sector, loading the first and second counters, and transferring data until data has been transferred to or from every data sector in the series.

20. A method for transferring data to or from a series of headerless data sectors on a track, the method comprising:

generating for each data sector on the track a set of control words corresponding to the data sector, wherein the control words are generated from values in a first memory and indicate data counts for fields in the headerless data sectors;

setting a sector number in a disk sequencer to identify a data sector on the track;

loading a first-in-first-out buffer with the set of control words corresponding to the data sector identified by the sector number;

determining whether a control word corresponding to the data sector identified by the sector number has a value indicating that the data sector is in the series;

flushing the first-in-first-out buffer and incrementing the sector number if the control word indicates the data sector indicated by the sector number is not in the series; and transferring data to or from the data sector identified by the sector number if the control word indicates the data sector is in the series, wherein when transferring data, the disk sequencer uses control words from the first-in-first-out buffer to identify boundaries of data fields of the data sector.

21. The method of claim 20, further comprising writing the control words generated from values in the first memory into a second memory, wherein loading the first-in-first-out buffer loads the control words from the second memory into the first-in-first-out buffer.

22. The method of claim 21, wherein the second memory is a portion of a data buffer coupled to the disk sequencer.

23. The method of claim 22, further comprising altering the control words in the second memory during a seek to the track so that the control words correctly identify which data sectors are in the series.

24. A data transfer method for transferring data to or from a series of headerless data sectors on a track on a disk, wherein at least one of the data sectors in the series has data locations in more than one data field, the method comprising:

storing into a first memory, one or more control words for each data sector in the series, wherein at least one control word for each data sector in the series contains a validity value, and at least one control word for each data sector in the series contains a split value, the validity value indicating whether the data sector should be skipped during the data transfer;

selecting a current data sector from the series of data sectors;

loading a first-in-first-out buffer with at least a split value from a control word for the current data sector;

skipping data transfer for the current sector if a validity value for the current data sector indicates the current data sector is to be skipped;

transferring data to or from the current data sector using the split value for the current data sector if the validity value indicates the current data sector is not to be skipped; and flushing any control words for the current data sector out of the first-in-first-out buffer before repeating the selecting, loading, skipping, and transferring steps.

25. The data transfer method of claim 24, wherein:

each data sector in the series has one control word that contains a flag indicating the control word is the last control word for the data sector; and flushing comprises sequentially removing control words from the first-in-first-out buffer until a control word removed from the first-in-first-out buffer contains the flag indicating the control word is the last control word for the data sector.

26. The method of claim 24, wherein storing further comprises:

reading the control words from a second memory;

writing the control words into the first memory; and altering the validity values of the control words in the first memory to indicate whether data sectors are to be skipped.

27. The data transfer method of claim 26, wherein reading and writing the control words occur during start-up of a disk drive system containing the disk.

28. The data transfer method of claim 27, wherein altering the validity values occurs during a seek to the track containing the series of headerless data sectors.

29. A method for transferring data to or from a series of headerless data sectors on a track on a constant density recording format disk, wherein at least one of the data sectors in the series has data locations in more than one data field, the method comprising:

generating control words which indicate data counts for fields in the headerless data sectors in the series, wherein the control words are generated from values in a first memory;

loading the control words into a first-in-first-out buffer;

selecting a current data sector from the series of data sectors;

loading a first counter with a first data count from the first-in-first-out buffer;

loading a second counter with a second data count that indicates an amount of data to be transferred to or from the current data sector; and transferring data to or from the current data sector, wherein values in the first and second counters change in response to each unit of data transferred and are used to identify boundaries of data fields.

30. The method of claim 29, wherein loading the first-in-first-out buffer further comprises loading a control word from the microprocessor, into the first-in-first-out buffer, while executing a servo routine.

31. The method of claim 29, wherein loading the first-in-first-out buffer further comprises loading into the first-in-first-out buffer, by the microprocessor, control words indicating splits in N data frames every N times a servo routine is executed, wherein N is a positive integer.

32. The method of claim 29, wherein transferring comprises transferring data by a disk sequencer between a data buffer and the current data sector.

33. The method of claim 29, further comprising repeating selecting the current data sector, loading the first and second counters, and transferring data until data has been transferred to or from every data sector in the series.

34. The method of claim 29, wherein transferring data comprises:

halting the data transfer to or from the current data sector in response to the value in the first counter reaching a first cutoff value, and then executing a servo routine, loading the first counter with another value from the first-in-first-out buffer, and upon completion of the servo routine, resuming the data transfer to or from the current data sector; and ending the data transfer to or from the current data sector in response to the value in the second counter reaching a second cutoff value.

35. The method of claim 29, wherein generating comprises using a microprocessor to generate the control words from a first table indicating split values for data sectors and a second table indicating defective data sectors.

36. The method of claim 35, wherein loading the first-in-first-out buffer comprises loading a control word from the microprocessor into the first-in-first-out buffer while executing a servo routine.

37. A method for transferring data to or from a series of headerless data sectors on a track on a constant density recording format disk, wherein at least one of the data sectors in the series has data locations in more than one data field, the method comprising:

generating control words which indicate data counts for fields in the headerless data sectors in the series, wherein the control words are generated from values in a first memory;

loading the control words into a first-in-first-out buffer;

loading a first counter with a first data count from the first-in-first-out buffer;

loading a second counter with a second data count that indicates an amount of data to be transferred; and determining whether a current data sector is in the series of data sectors;

generating a sector pulse to a disk sequencer in response to the current data sector being in the series, wherein the disk sequencer begins transferring data between a data buffer and the current data sector in response to the sector pulse, and values in the first and second counters change in response to each unit of data transferred and are used to identify boundaries of data fields; and suppressing the sector pulse to the disk sequencer for the current data sector in response to the current data sector not being in the series.

38. The method of claim 37, wherein determining whether the current data sector is in the series comprises determining whether the current data sector is defective, wherein if a data sector is defective, the defective data sector is not in the series and a sector pulse for a defective sector is suppressed.

39. The method of claim 37, wherein a microprocessor generates the control words from values in the first memory.

40. The method of claim 37, further comprising writing the control words in a second memory, wherein the first-in-first-out buffer is loaded with control words from the second memory.

41. The method of claim 40, wherein the second memory is a portion of the data buffer.

42. A disk drive system for transferring data to or from a series of headerless data sectors on a track on a constant density recording format disk, wherein at least one of the headerless data sectors in the series has data locations in more than one data field, the system comprising:

a non-volatile memory containing a table of split values for the disk;

a second memory;

a microprocessor coupled to the non-volatile memory, the microprocessor comprising: means for generating control words from values in the table of split values, wherein each control word indicates a data count for a field associated with the control word; and means for writing the control words to the second memory; and a disk sequencer coupled to the second memory, wherein the disk sequencer comprises:

a first register which holds a pointer indicating an address in the second memory;

means for moving a control word at the address indicated by the pointer, from the second memory, into the disk sequencer;

means for transferring data to or from the disk in amounts indicated by the data counts from the control words moved into the data sequencer; and means for incrementing the pointer for each control word moved into the disk sequencer.

43. The disk drive system of claim 42, wherein the disk sequencer further comprises:

a second register which holds a second value;

a third register which holds a third value; and means for setting the pointer equal to the third value in response to the pointer reaching the second value.

44. The disk drive system of claim 42, wherein:

the disk sequencer further comprises a first-in-first-out first-out buffer; and the means for moving comprises a buffer filler which fills the first-in-first-out buffer with control words at the address indicated by the pointer.

45. The disk drive system of claim 44, wherein filling the first-in-first-out buffer by the buffer filler is asynchronous with transferring of data.

46. A method for transferring data to or from a series of headerless data sectors on a track, the method comprising:

generating control words which indicate data counts for fields in the headerless data sectors in the series;

loading the control words into a disk sequencer;

determining whether a current data sector is in the series of headerless data sectors;

generating a sector pulse to the disk sequencer for the current data sector in response to the current data sector being in the series, wherein the disk sequencer begins transferring data between a data buffer and the current data sector in response to the sector pulse and uses the control words during the transfer to identify boundaries of one or more data fields of the current data sector; and suppressing a sector pulse to the disk sequencer for the current data sector in response to the current data sector not being in the series.

* * * * *

UNITED STATES PATENT AND TRADEMARK OFFICE
CERTIFICATE OF CORRECTION

PATENT NO.   : 5,715,106
DATED        : February 3, 1998
INVENTORS    : Fred A. Kool; John S. Packer; Nicolas C. Assouad It is certified that error appears in the above-identified patent and that said Letters Patent is hereby corrected as shown below:

Col. 9, line 14, delete "Figs. 4A and 4".

Col. 9, line 52, after "burst" insert --;--.

Col. 10, line 1, delete "38" and insert --3B--.

Col. 12, line 53, "Fig. 5D schematically" begins a new paragraph.

Col. 13, line 2, delete "which".

Col. 18, line 45, delete "222" and insert --1122--.

Signed and Sealed this

Sixth Day of October, 1998

*Attest:*

BRUCE LEHMAN

*Attesting Officer*      *Commissioner of Patents and Trademarks*